(12) United States Patent
Bartling et al.

(10) Patent No.: US 8,599,155 B2
(45) Date of Patent: Dec. 3, 2013

(54) TOUCH SENSE USING TIME DOMAIN REFLECTOMETRY

(75) Inventors: James S. Bartling, Chandler, AZ (US); Padmaraja Yedamale, Chandler, AZ (US); Jerry Hanauer, Germantown, WI (US)

(73) Assignee: Microchip Technology Incorporated, Chandler, AZ (US)

( * ) Notice: Subject to any disclaimer, the term of this patent is extended or adjusted under 35 U.S.C. 154(b) by 435 days.

(21) Appl. No.: 12/912,964

(22) Filed: Oct. 27, 2010

(65) Prior Publication Data

US 2011/0267287 A1 Nov. 3, 2011

Related U.S. Application Data

(60) Provisional application No. 61/329,650, filed on Apr. 30, 2010.

(51) Int. Cl.
*G06F 3/041* (2006.01)
(52) U.S. Cl.
USPC .......................... 345/173; 345/174; 178/18.07
(58) Field of Classification Search
None
See application file for complete search history.

(56) References Cited

U.S. PATENT DOCUMENTS

| | | | | |
|---|---|---|---|---|
| 5,764,200 A * | 6/1998 | Odmark | ......................... | 345/1.1 |
| 6,137,282 A * | 10/2000 | Macke et al. | ................. | 324/71.1 |
| 6,239,790 B1 * | 5/2001 | Martinelli et al. | ............ | 345/174 |
| 7,460,441 B2 | 12/2008 | Bartling | ........................ | 368/118 |
| 7,764,213 B2 | 7/2010 | Bartling et al. | ............... | 341/152 |
| 2001/0035769 A1 * | 11/2001 | Takekuma et al. | .............. | 326/30 |
| 2002/0154100 A1 * | 10/2002 | Hatakeda et al. | ............. | 345/173 |
| 2004/0239616 A1 * | 12/2004 | Collins | ......................... | 345/156 |
| 2005/0012709 A1 * | 1/2005 | Ohshima et al. | .............. | 345/107 |
| 2008/0169826 A1 * | 7/2008 | Bartling | ....................... | 324/658 |
| 2008/0204046 A1 | 8/2008 | Bartling | ....................... | 324/658 |
| 2008/0316180 A1 * | 12/2008 | Carmody et al. | ............. | 345/172 |
| 2010/0001889 A1 | 1/2010 | Bartling et al. | ............... | 341/122 |
| 2010/0102832 A1 | 4/2010 | Bartling et al. | ............... | 324/679 |
| 2011/0128236 A1 * | 6/2011 | Faubert | ........................ | 345/173 |
| 2011/0128257 A1 | 6/2011 | Kim | .............................. | 345/175 |

FOREIGN PATENT DOCUMENTS

| | | | | |
|---|---|---|---|---|
| EP | 0483519 A1 | 5/1992 | .............. | G01B 7/03 |
| EP | 2003887 A1 | 12/2008 | .............. | G06F 3/023 |
| WO | 2011/137201 A2 | 11/2011 | .............. | G06F 3/041 |

OTHER PUBLICATIONS

International PCT Search Report and Written Opinion, PCT/US2011/034229, 21 pages, Mailed Nov. 3, 2011.
Bohn, Bruce; Microchip Application Note AN1250, "Microchip CTMU for Capacitive Touch Applications", www.microchip.com, Feb. 3, 2009.

(Continued)

*Primary Examiner* — Alexander Eisen
*Assistant Examiner* — Nan-Ying Yang
(74) *Attorney, Agent, or Firm* — King & Spalding L.L.P.

(57) ABSTRACT

A touch panel or screen has a serpentine transmission line fabricated on a substrate, e.g., printed circuit board, LCD, plasma or LED screen, etc., and has a constant impedance. A touch to the touch panel will cause a change of impedance of the transmission line at the location of the touch. Time domain reflectometry (TDR) is used for determining the location of the change of impedance of the transmission line by accurately measuring the return pulse time at the source of the initial pulse, and then converting the return pulse time to X-Y coordinates of the touch panel or screen.

27 Claims, 14 Drawing Sheets

(56) References Cited

OTHER PUBLICATIONS

International PCT Search Report and Written Opinion, PCT/US2012/033758, 15 pages, Jul. 11, 2012.

Rekimoto, J., "Smartskin: An Infrastructure for Freehand Manipulation on Interactive Surfaces", Interaction Laboratory, Sony Computer Science Laboratories, Inc., 8 pages, Apr. 20, 2002.

* cited by examiner

TOUCH SENSE USING TIME DOMAIN REFLECTOMETRY

RELATED PATENT APPLICATION

This application claims priority to commonly owned U.S. Provisional Patent Application Ser. No. 61/329,650; filed Apr. 30, 2010; entitled "Touch Sense Using Time Domain Reflectometry," by James E. Bartling, Padmaraja Yedamale and Jerry Hanauer; and is hereby incorporated by reference herein for all purposes.

TECHNICAL FIELD

The present disclosure relates to touch sense panels and screens, and more particularly, to sensing positions being touched on the touch sense panels and screens by using time domain reflectometry (TDR).

BACKGROUND

Touch sense panels and screens are used in a multitude of applications for user interfacing with consumer appliances, commercial and industrial control panels, etc. A plurality of touch sensors, e.g., capacitive, inductive, resistive, arranged in a matrix may each be individually actuated by placing an object such as a finger over specific areas of the touch sensor matrix. Each of the plurality of touch sensors arranged in the matrix has a defined area of activation and once the touch sensor matrix is design, no variation from its design layout is possible. Also fabrication of the matrix of touch sensors in the panel and supporting electronics thereto can be complicated and expensive.

SUMMARY

Therefore, it is desirable to have a touch panel or screen that is both flexible in design and implementation, and low in cost to fabricate. According to the teachings of this disclosure, a touch panel has a serpentine transmission line fabricated on a substrate, e.g., printed circuit board, and has a constant impedance. A touch to the touch panel will cause a change of impedance of the transmission line at the location of the touch. Time domain reflectometry (TDR) is used for determining the location of the change of impedance of the transmission line by accurately measuring the return pulse time at the source of the initial pulse, and then converting the return pulse time to X-Y coordinates of the touch panel.

The touch panel or screen, or any touch application may be implemented on a substrate with one or more serpentine transmission lines. Using a serpentine transmission line(s) on a substrate for touch sensing lowers the cost of manufacture, greatly simplifies the design of a touch panel since there are no physical limitations as to where and how many touch areas may be implemented, ease of touch position software program implementation, and more reliable and accurate touch sensing then conventional touch sense implementations.

The theory behind the timing circuits disclosed herein are more fully described in commonly owned U.S. Pat. No. 7,460,441; entitled "Measuring a Long Time Period" by James E. Bartling; U.S. Patent Application Publication No. 2010/0001889, entitled "Current-Time Digital-to-Analog Converter" by James E. Bartling; U.S. Patent Application Publication No. 2008/0204046, entitled "Capacitance Measurement Apparatus and Method" by James E. Bartling; and Microchip Application Note AN1250, entitled "Microchip CTMU for Capacitive Touch Applications" by Bruce Bohn (available at www.microchip.com); all of which are hereby incorporated by reference herein for all purposes.

According to a specific example embodiment of this disclosure, a method for sensing a touch to a substrate and determining a location thereof comprises the steps of: sending a first pulse to a first end of a serpentine transmission line fabricated on a substrate comprising a plurality of touch locations, wherein the serpentine transmission line is unterminated at a second end thereof; charging a timing capacitor with a constant current source until a first touch return pulse is received at the first end of the serpentine transmission line; measuring a first voltage on the timing capacitor; and converting the measured first voltage to a first location on the substrate. The method further comprises the steps of: sending a second pulse to the second end of the serpentine transmission line, wherein the serpentine transmission line is unterminated at the first end thereof; charging the timing capacitor with the constant current source until a second touch return pulse is received at the second end of the serpentine transmission line; measuring a second voltage on the timing capacitor; and converting the measured second voltage to a second location on the substrate.

According to another specific example embodiment of this disclosure, a method for sensing a touch to a substrate and determining a location thereof comprises the steps of: sending a first pulse to a first end of a serpentine transmission line fabricated on a substrate comprising a plurality of touch locations, wherein the serpentine transmission line is terminated at a second end thereof with a first resistor having a resistance substantially equal to a characteristic impedance of the serpentine transmission line; charging a timing capacitor with a constant current source until a first return pulse is received at the first end of the serpentine transmission line; measuring a first voltage on the timing capacitor; and converting the measured first voltage to a first location on the substrate. The method further comprises the steps of: sending a second pulse to the second end of the serpentine transmission line, wherein the serpentine transmission line is terminated at the first end with a second resistor having a resistance substantially equal to the characteristic impedance of the serpentine transmission line; charging the timing capacitor with the constant current source until a second return pulse is received at the second end of the serpentine transmission line; measuring a second voltage on the timing capacitor; and converting the measured second voltage to a second location on the substrate.

According to still another specific example embodiment of this disclosure, a method for sensing a touch to a substrate and determining a location thereof comprises the steps of: a method for sensing a touch to a substrate and determining a location thereof comprises the steps of: a) initializing a time of a time measurement device; b) coupling a pulse driver to a first end of a serpentine transmission line fabricated on a substrate comprising a plurality of touch locations, wherein the serpentine transmission line is un-terminated at a second end thereof; c) start sending a pulse with the pulse driver at the first end of the serpentine transmission line; d) starting the time in the time measurement device; e) detecting whether a negative return pulse, caused by a touch on the substrate, is received at the first end of the serpentine transmission line, wherein if the negative return pulse is detected then going to step g), and if not then going to step f); f) detecting when a positive return pulse is received at the first end of the serpentine transmission line, the positive return pulse being from the un-terminated second end of the serpentine transmission line, wherein if the positive return pulse is detected then returning to step a), and if not then returning to step e); g) stopping the time in the time measurement device; h) reading the time from the time measurement device; and i) converting the time read from the time measurement device into a location of the touch on the substrate then returning to step a).

According to another specific example embodiment of this disclosure, a method for sensing a touch to a substrate and determining a location thereof comprises the steps of: a) initializing a time of a time measurement device and setting a count N in a touch counter to N=1; b) coupling a pulse driver to a first end of a serpentine transmission line fabricated on a substrate comprising a plurality of touch locations, wherein the serpentine transmission line is un-terminated at a second end thereof; c) start sending a pulse with the pulse driver at the first end of the serpentine transmission line; d) starting the time in the time measurement device; e) detecting whether a negative return pulse, caused by a touch on the substrate, is received at the first end of the serpentine transmission line, wherein if the negative return pulse is detected then going to step g) and if not then going to step f); f) detecting when a positive return pulse is received at the first end of the serpentine transmission line, the positive return pulse being from the un-terminated second end of the serpentine transmission line, wherein if the positive return pulse is detected then returning to step a) and if not then returning to step e); g) sampling the time from the time measurement device associated with the negative return pulse detected in step e); h) storing the sampled time in a memory location having an address N; i) incrementing N (N=N+1); j) determining whether N is greater than M, M is a number of memory locations available to store the sampled times, wherein if N is not greater than M then returning to step e) and if N is greater than M then going to step k); and k) converting the sampled times stored in the memory locations into locations of the touches on the substrate then returning to step a).

According to a specific example embodiment of this disclosure, an apparatus for sensing a touch to a substrate and determining a location thereof comprises: a pulse generator for generating pulses; a first pulse driver having an input coupled to the pulse generator and an output coupled through a first resistor to a first end of a serpentine transmission line fabricated on a substrate, a second resistor coupled to a second end of the serpentine transmission line, wherein the first and second resistors each have resistances that are substantially equal to a characteristic impedance of the serpentine transmission line; a constant current source; a timing capacitor; an analog-to-digital converter (ADC); and a digital processor; wherein the pulse generator generates a first pulse to the first pulse driver which sends the first pulse to the first end of the serpentine transmission line, and then the constant current source starts charging the timing capacitor until a first return pulse is received at the first end of the serpentine transmission line; a first voltage charge on the timing capacitor is sampled by the ADC and converted to a first digital value; and the digital processor receives the first digital value from the ADC and converts the first digital value to a first location on the substrate. The apparatus further comprises: a second pulse driver having an input coupled to the pulse generator and an output coupled through the second resistor to the second end of the serpentine transmission line, and the first resistor is coupled to the first end of the serpentine transmission line; wherein the pulse generator generates a second pulse to the second pulse driver which sends the second pulse to the second end of the serpentine transmission line, and then the constant current source starts charging the timing capacitor until a second return pulse is received at the second end of the serpentine transmission line; a second voltage charge on the timing capacitor is sampled by the ADC and converted to a second digital value; and the digital processor receives the second digital value from the ADC and converts the second digital value to a second location on the substrate.

According to another specific example embodiment of this disclosure, an apparatus for sensing touches to a substrate and determining locations thereof comprises: a pulse generator for generating a pulse; a pulse driver having an input coupled to the pulse generator and an output coupled through a first resistor to a first end of a serpentine transmission line fabricated on a substrate, a second resistor coupled to a second end of the serpentine transmission line, wherein the first and second resistors each have resistances that are substantially equal to a characteristic impedance of the serpentine transmission line; a voltage comparator having negative and positive inputs and an output, wherein the negative input is coupled to the first end of the serpentine transmission line; a voltage reference having a reference voltage output coupled to the positive input of the voltage comparator; a high resolution timer having an enable input coupled to the output of the pulse driver; a plurality of storage locations for storing a plurality of touch times sampled from the high resolution timer; a touch counter that increments a touch count number each time a negative return pulse is detected by the voltage comparator, wherein the negative return pulse represents a touch to the substrate; and a digital processor coupled to the plurality of storage locations; wherein the high resolution timer starts timing when the pulse driver sends the pulse to the first end of the serpentine transmission line, and each time a negative return pulse is detected by the voltage comparator an associated time from the high resolution timer is stored in a respective one of the plurality of storage locations determined by the touch count number from the touch counter; and wherein the digital processor reads the times stored in the plurality of storage locations and converts these times into locations on the substrate.

BRIEF DESCRIPTION OF THE DRAWINGS

A more complete understanding of the present disclosure thereof may be acquired by referring to the following description taken in conjunction with the accompanying drawings wherein.

Figure 1:
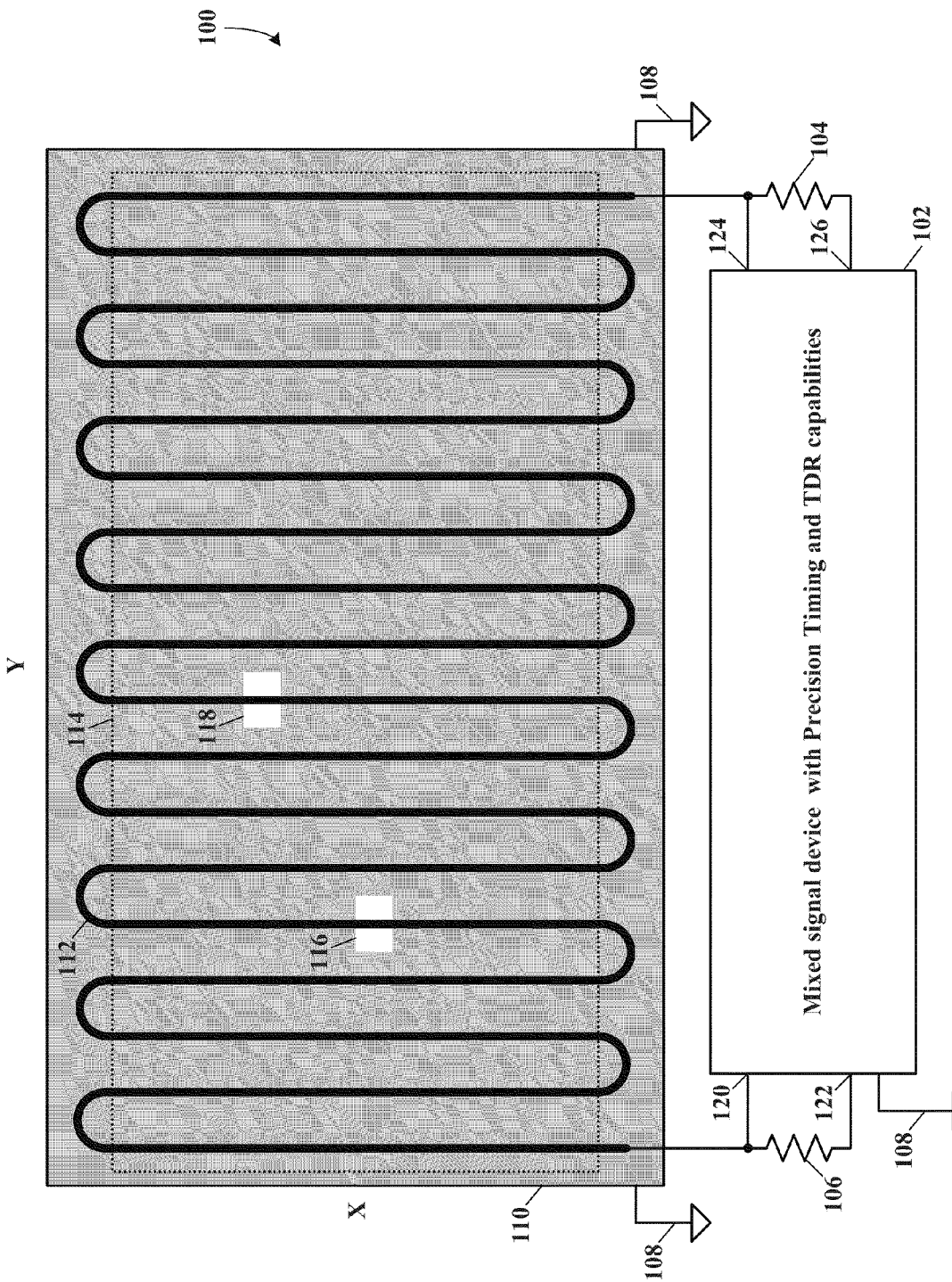
FIG. 1 illustrates a schematic block diagram of a touch panel or touch screen system, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of an example embodiment is schematically illustrated. Like elements in the drawings will be represented by like numbers, and similar elements will be represented by like numbers with a different lower case letter suffix.

Time domain reflectometry (TDR) works on a similar principle as radar. A pulse of energy is transmitted down an electrically conductive path (e.g., transmission line) having a constant impedance. When that pulse reaches an un-terminated end of the electrically conductive path, or there is a change of impedance along the electrically conductive path, part or all of the pulse of energy is reflected back to its source. When two metallic conductors are placed in close proximity together, they form a transmission line having a characteristic impedance determined by the spacing of the metallic conductors and the insulating dielectric therebetween. If the transmission line is terminated in its characteristic impedance there will be no reflected pulse back to the where the pulse originated at the beginning of the transmission line. If the transmission line is un-terminated then there will be a positive reflected pulse back to where the transmitted pulse originated at the beginning of the transmission line. When there is a impedance difference anywhere along the transmission line, there will be a reflected pulse generated and subsequently detected. The time it takes for this reflected pulse to return to the pulse source location is used in determining the distance at which the impedance difference has occurred. An increase in capacitance (e.g., finger touch) along the transmission line will cause the return reflected pulse to be negative with respect to the generated (transmitted) pulse.

According to the teachings of this disclosure, a TDR circuit generates a pulse of energy, then measures the time interval between generation of a source pulse and detection of a reflected pulse back to the generated pulse source. This measured time interval is used to determine the distance from the source of the generated pulse to the impedance "bump" causing the reflected pulse. The measured time interval can be converted into a distance on the electrically conductive path and/or a physical location, e.g., X and Y coordinates of the touch panel. A table lookup and/or calculation may be used for conversion of the time interval to distance and/or physical location.

Referring to FIG. 1, depicted is a schematic block diagram of a touch panel or touch screen system, according to the teachings of this disclosure. A touch panel or screen, generally represented by the numeral 100, comprises a substrate 110 having a conductive side and a non-conductive side, a constant impedance serpentine strip line 112 proximate to the non-conductive side of the substrate 110, a mixed signal integrated circuit device 102, a first termination resistor 106 and a second termination resistor 104. For the touch panel, the constant impedance serpentine strip line 112 and substrate 110 may be fabricated from a double sided printed circuit board (PCB) wherein one side of the PCB is a continuous copper foil (connected to a power supply common or ground at node 108) and the other side is copper foil etched into the serpentine stripe line 112 configuration shown in FIG. 1. For the touch screen, a light transmissive insulating material has a front side with the serpentine transmission line 112 (either made of light transmissive material or very thin electrically conductive material that does not substantially block light passing therethrough) thereon and a back side covered with a light transmissive and electrically conductive material, e.g., indium tin oxide (ITO). A liquid crystal display (LCD), a light emitting diode (LED) display, a plasma display, an organic light emitting diode (OLED) display, etc., may be placed behind the aforementioned touch screen for displaying graphics and other visual indications such as pushbuttons, slide switches, gauges, dials, etc.

The serpentine stripe line 112 on the front side and the conductive layer on the back side of the substrate of the touch panel or touch screen create a constant impedance strip line type of transmission line that when terminated in it's characteristic impedance has no signal reflections, e.g., voltage standing wave ratio (VSWR) 1:1, and when un-terminated has a positive signal reflection substantially equal in amplitude to the generated pulse. The first and second termination resistors 106 and 104 have resistances substantially equal to the characteristic impedance of the serpentine strip line 112. However, when there is an impedance mismatch anywhere along the serpentine strip line 112, a reflected (negative signal) pulse will be returned to the end where the generated (signal) pulse was first applied.

A panel operating area 114 may be divided into plurality of touch areas, e.g., touch areas 116 and 118 are representative of two such touch areas. When an object (not shown), e.g., a finger, is placed in close proximity to a touch area, that portion of the strip line 112 in the affected touch area will change impedance. Now there is an impedance "bump" that causes a reflected pulse that returns back to the generated pulse source. By measuring the time it takes for the reflected pulse to arrive back at the signal source, a distance from the signal source to the panel operating area 114 being touched can be determined.

Figure 2:
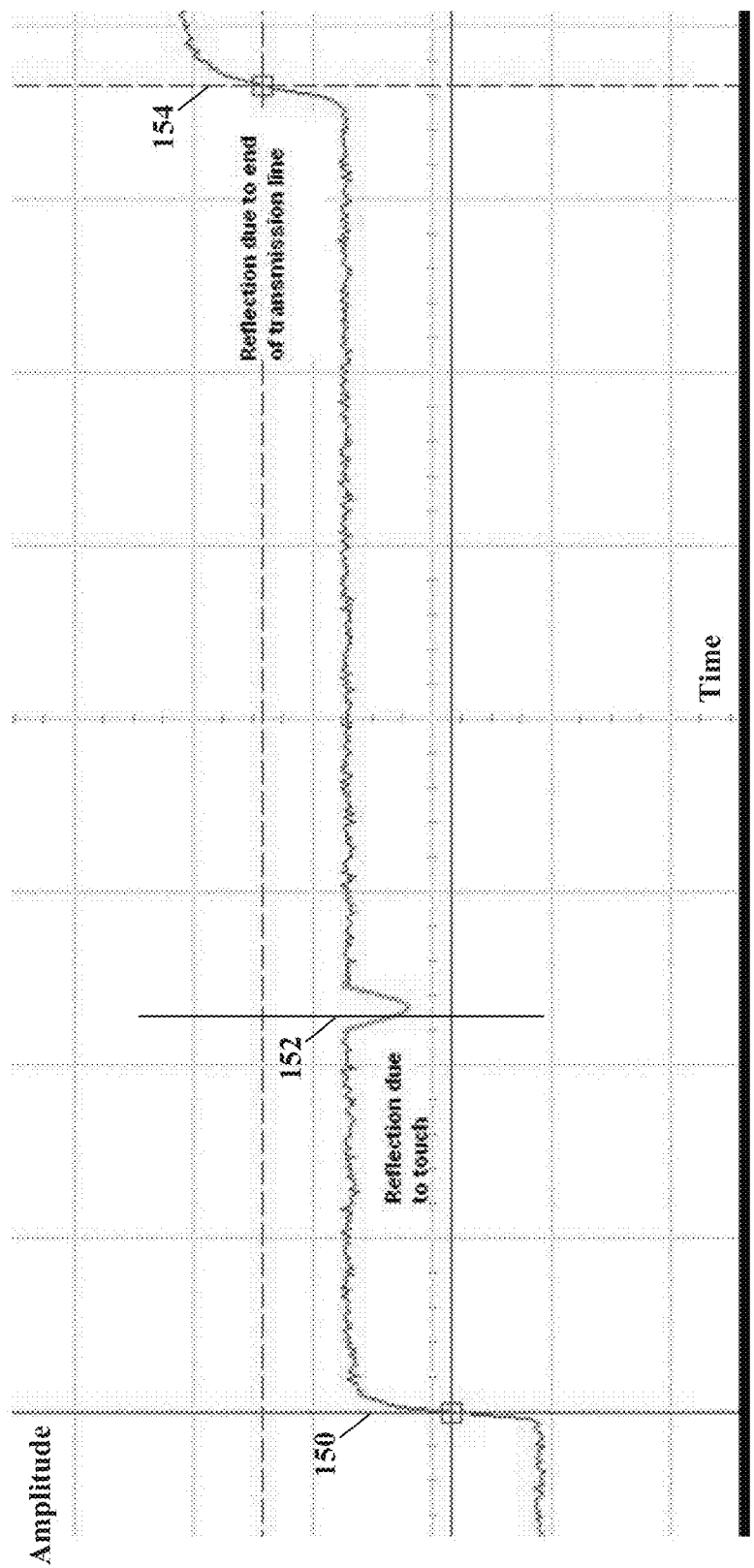
FIG. 2 illustrates a voltage-timing graph of a pulse waveform of a touch panel or touch screen system shown in FIG. 1, according to the teachings of this disclosure.

Referring to FIG. 2, depicted is a voltage-timing graph of a pulse waveform of a touch panel or touch screen system shown in FIG. 1, according to the teachings of this disclosure. The mixed signal integrated circuit device 102 generates a pulse at node 122 (FIG. 1) having an amplitude of approximately $V_{DD}$. Since resistor 106 has substantially the same resistance as the characteristic impedance of the serpentine stripe line 112, the pulse at node 120 will rise to $V_{DD}/2$ at time 150. A return pulse caused by a touch to the panel operating area 114 has a negative amplitude and appears at time 152. The generated pulse returning from the open (un-terminated) end of the serpentine stripe line 112 (e.g., in FIG. 1 nodes 124 and 126 are both at a high impedance) will have a positive amplitude, e.g., approximately $V_{DD}/2$, at time 154 and will add to the originally generated pulse amplitude, resulting in a more positive amplitude e.g., approximately $V_{DD}$, after time 154. By detecting the leading edges caused by the changes in amplitudes of the voltages at node 120, these three time events (at time 150 detecting a positive edge going to an amplitude of approximately $V_{DD}/2$, at time 152 detecting a negative edge going to an amplitude of less than $V_{DD}/2$, and at time 154 detecting a positive edge going to an amplitude of approximately $V_{DD}$) are used for determining the touched location and when the generated pulse should be terminated, as more fully described hereinafter.

Figure 3:
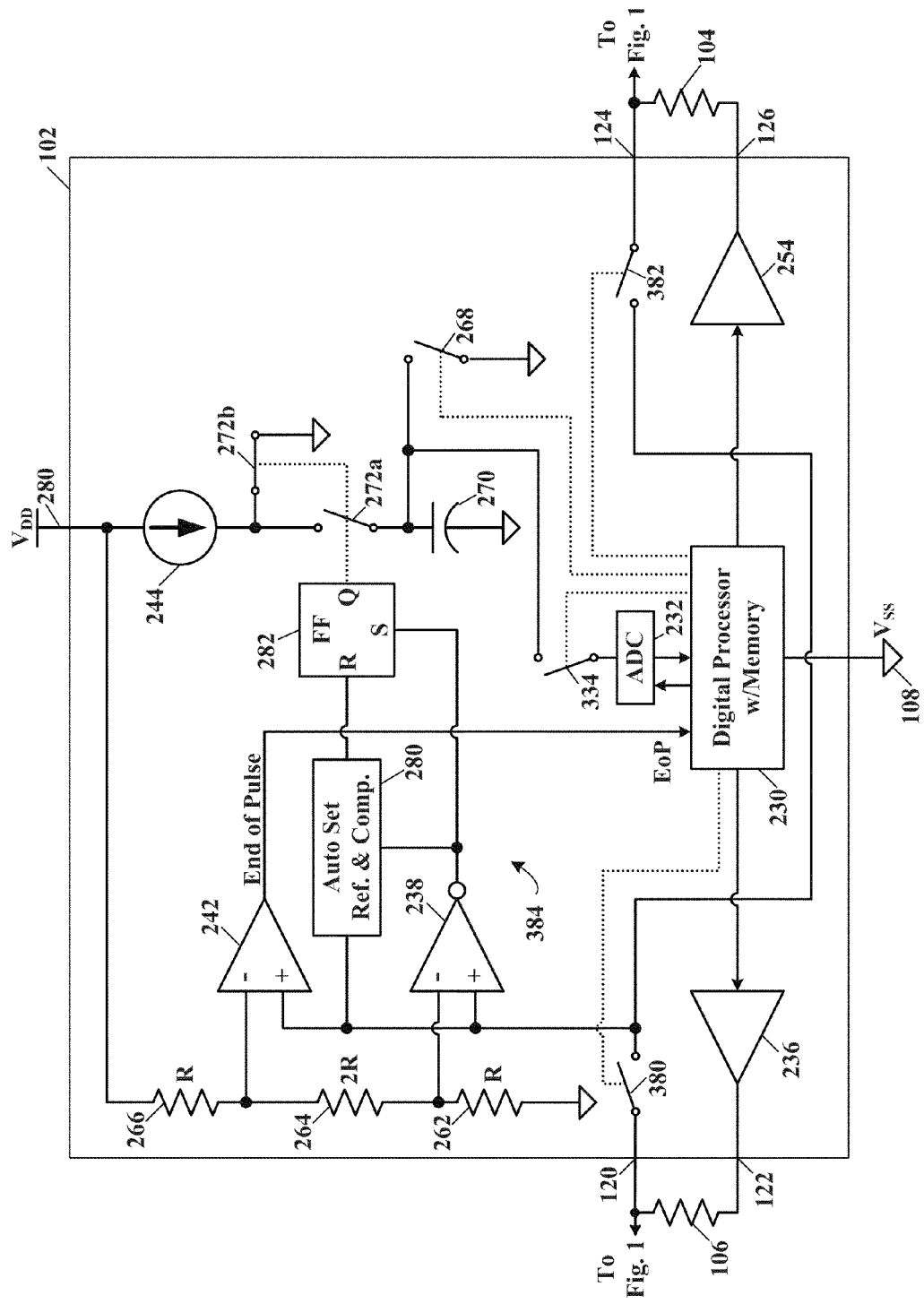
FIG. 3 illustrates a schematic block diagram of a mixed signal integrated circuit device of the touch panel or touch screen system shown in FIG. 1, according to a specific example embodiment of this disclosure.

Referring to FIG. 3, depicted is a schematic block diagram of a mixed signal integrated circuit device of the touch panel or touch screen system shown in FIG. 1, according to a specific example embodiment of this disclosure. The mixed signal integrated circuit device 102 comprises a digital processor 230 (with memory), an analog-to-digital converter 232, ADC switch 334, first sample switch 380, second sample switch 382, and a reflected pulse return time measurement circuit. The digital processor 230 may be for example, but is not limited to, a microcontroller, a microprocessor, a digital signal processor (DSP), an application specific integrated circuit (ASIC), programmable logic array (PLA), and the like.

The reflected pulse return time measurement circuit 384 comprises voltage comparators 238 and 242, automatic setting reference and comparator 280, charging control flip-flop 282, voltage divider resistors 262, 264 and 266, constant current source 244, charging switch 272 (normally open switch 272a and normally closed switch 272b), timing capacitor 270 and discharge switch 268. The comparator 238 has an inverting output, however, an inverter may be used on the output of a standard non-inverting output comparator. The voltage divider resistors 262, 264 and 266 provide reference voltages of $\frac{1}{4} V_{DD}$ to the negative input of the comparator 238 and $\frac{3}{4} V_{DD}$ to the negative input of the comparator 242. Therefore, when a voltage at node 120 is more positive than $\frac{1}{4} V_{DD}$ the output of the comparator 238 will go to a logic low or "0." The output of the comparator 238 at logic low or "0" causes the charging control flip-flop 282 to "set" the Q output to a logic high or "1," thereby closing the charging switch 272a, wherein the timing capacitor 270 begins charging from the constant current source 244. When the voltage at node 120 is more positive than $\frac{3}{4} V_{DD}$ the output of the comparator 242 will be at a logic high or "1." This signifies that the generated pulse has returned from the other end of the serpentine strip line 112 at node 124 that is open (at high impedance). The comparator 242 indicates this with an end of pulse (EoP) output signal to the processor 230. Once this occurs the processor 230 stops generating the pulse.

The automatic setting reference and comparator 280 functions as follows: when a positive going edge is detected by comparator 238, the voltage amplitude of the generated pulse at node 120 is sampled and stored as a touch return pulse reference voltage minus an offset voltage, e.g., approximately $V_{DD}/2 - \Delta V$. When the touch return pulse negative voltage is added to the generated pulse voltage at node 120 the resultant voltage will be less than $V_{DD}/2 - \Delta V$ (see FIG. 2), the output from the automatic setting reference and comparator 280 then goes to a logic "0," resetting the charging control flip-flop 282 which causes the charging switch 272a to open, thereby stopping the charging of the timing capacitor 270.

The digital processor 230 controls all operations of the circuits of the device 102 as follows. Before a source pulse is generated the timing capacitor 270 is fully discharged through the discharge switch 268. Switch symbols are shown for explanation clarity, however, normally a semiconductor device would be used for such switches. Once the timing capacitor 270 is fully discharged, the discharge switch 268 is opened. Next a pulse is generated by the digital processor 230 and sent to the first pulse driver 236. Before or contemporaneously with sending of the generated pulse to the first pulse driver 236, the output of the second pulse driver 254 is set to a high impedance (e.g., tristate logic) so that the nodes 124 and 126 are effectively at a high impedance. Now the second end of the serpentine strip line 112 at node 124 is effectively open, thereby returning the generated pulse as described hereinabove. It is contemplated and within the scope of this disclosure that the second pulse driver 254 can be set to a logic low or "0" thereby grounding node 126. By grounding node 126, the second end of the serpentine strip line 112 connected at node 124 is effectively terminated at its characteristic impedance (e.g., resistance of the second termination resistor 104) and no return pulse will be generated. Thus, a return pulse from the un-terminated second end of the serpentine strip line 112 may be used to end the generated pulse as described hereinabove, or the processor 230 may generate a pulse having a fixed duration into a terminated second end of the serpentine strip line 112. Either way will accomplish the desired result. A plurality of pulses may be used for determining touches. When using an un-terminated (distal) second end, each of the plurality of pulses may be terminated upon detection of the respective generated pulse return. When using a terminated (distal) second end, each of the plurality of pulses may have fixed on and off times.

When the output of the first pulse driver 236 is at a logic low "0" the voltage at node 120 is at substantially zero volts. Therefore the positive input of the voltage comparator 238 is at less then $\frac{1}{4} V_{DD}$, the charging switch 272a is open, and the constant current shorting switch 272b is closed.

When a generated pulse from the output of the first pulse driver 236 is applied to node 122 the amplitude of this generated pulse at node 120 will be at about $\frac{1}{2} V_{DD}$ since the resistance of the first termination resistor 106 is substantially the same as the characteristic impedance of the serpentine strip line 112, and both are in series with the output of the first pulse driver 236, i.e., a $\frac{1}{2} V_{DD}$ voltage divider. Therefore, the voltage at the positive input of the voltage comparator 238 is above $\frac{1}{4} V_{DD}$ and its output is at a logic low "0." When the output of the comparator 238 goes to a logic low or "0," the charging control flip-flop 282 is "set" and the Q-output thereof goes to a logic high or "1," thereby closing the charging switch 272a, wherein the timing capacitor 270 begins charging from the constant current source 244.

Charging of the timing capacitor 270 creates a voltage that is determined by the length of time that the charging switch 272a is closed. If an impedance mismatch (e.g., touch at a touch area) occurs along any portion of the serpentine strip line 112, a reflected pulse will be generated at a time dependent upon the distance of this impedance mismatch from the source of the generated pulse at node 120.

Figure 5:
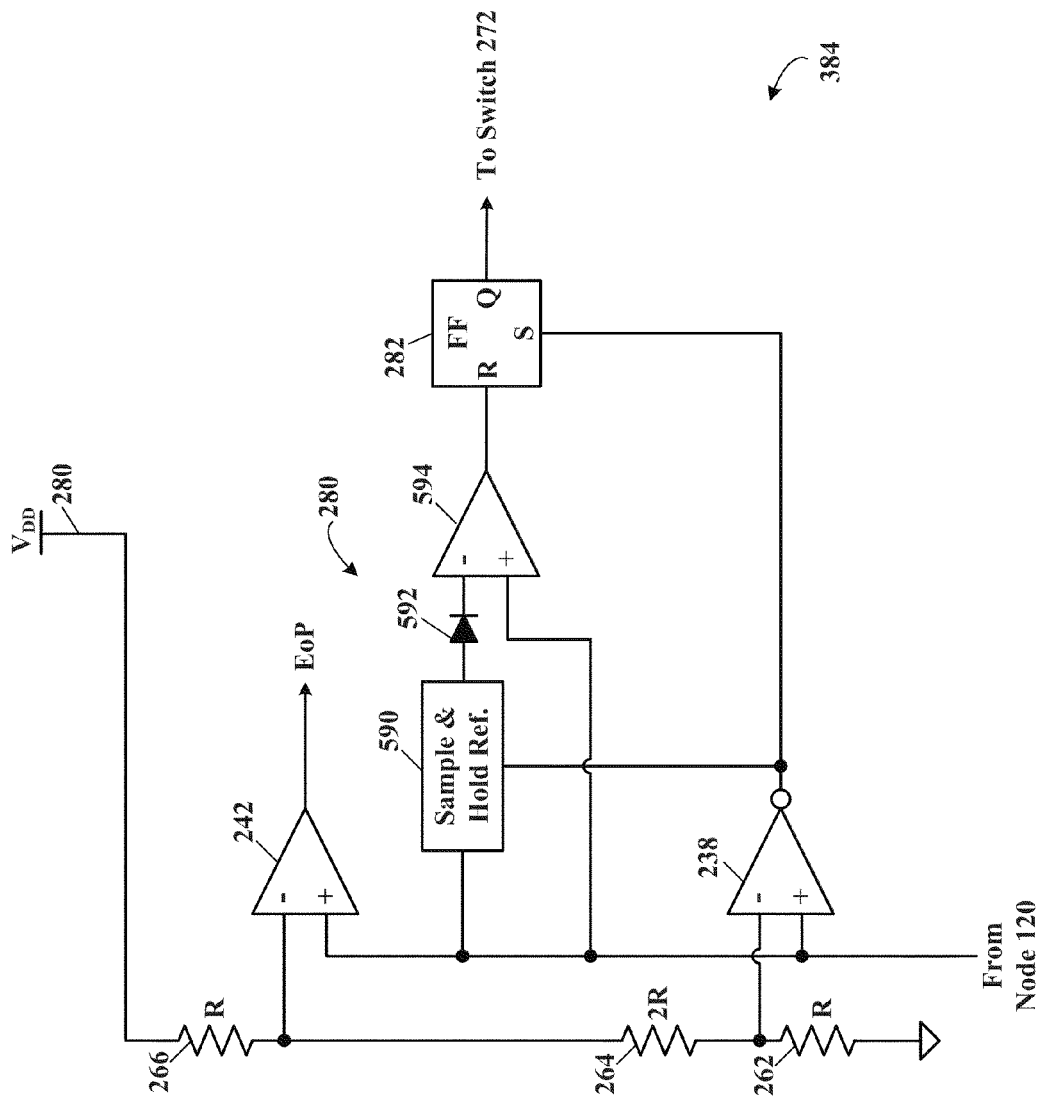
FIG. 5 illustrates a more detailed schematic diagram of a specific example embodiment of the pulse edge detectors shown in FIGS. 3 and 4.

The automatic setting reference and comparator 280 takes a sample of the generated pulse voltage at node 120 when the output of the comparator 238 goes to a logic low or "0." This sampled pulse voltage is stored and modified by subtracting a $\Delta V$ which results in a reflected touch pulse reference voltage of $V_{DD}/2-\Delta V$ that is used by a reflected touch pulse comparator 594 (e.g., see FIG. 5).

When a reflected touch pulse returns to the node 120, the voltage at node 120 will decrease and so will the voltage at a positive input of the return touch pulse voltage comparator 594 (FIG. 5). Assuming that the voltage (summation of the source and reflected pulse amplitudes) at node 120 is less than $V_{DD}/2-\Delta V$, the voltage at the positive input of the voltage comparator 592 is also less than $V_{DD}/2-\Delta V$ and its output goes to a logic low "0," thereby resetting the flip-flop 282. Thereafter, the charging switch 272a opens and the constant current source 244 stops charging the timing capacitor 270.

When the charging switch 272a opens, the voltage charge on the timing capacitor 270 now represents the time interval between when the source pulse was first generated and when the return touch pulse arrives at the node 120. This voltage charge is then sampled through multiplexer switch 234 and to the ADC 232 which converts this analog voltage to a digital representation thereof. The digital processor 230 receives the output of the ADC 232 which is a digital representative of the voltage charge on the timing capacitor 270. The digital processor 230 can now convert this digital voltage information into a X-Y position on the panel operating area 114 by using values in a look-up table stored in memory, and/or by calculating the voltage to time conversion wherein the time represents the distance of the impedance change on the serpentine strip line 112. Calibration of the voltage to X-Y position conversion values can also be determined after a touch panel (or screen) has been manufactured and/or recalibrated in the field, e.g., field calibration touch position values are stored in the memory of the digital processor 230. The memory that stores the touch position values may be nonvolatile, e.g., electrically erasable and programmable memory, Flash memory and the like. The touch panel (or screen) 100 disclosed herein is very flexible and simple to implement.

If termination of the second end of the serpentine strip line 112 is used as described hereinabove, a time interval need only be long enough for propagating a pulse over twice the length (known) of the serpentine strip line 112. For example, if there is no impedance "bump" that occurs on the serpentine strip line 112, then there will be no return touch pulse since the other end thereof is terminated at its characteristic impedance (second termination resistor 104), and the timing capacitor 272 will charge to a maximum voltage value. Since the digital processor 230 program knows this maximum time and maximum voltage value, TDR measurement time intervals need only be as long as this maximum time (e.g., maximum voltage value). Also the values of the timing capacitor 270 and constant current source 244 may be selected so that at the maximum time the voltage charge on the timing capacitor 270 is at the full scale resolution of the ADC 232. Therefore, very rapid and accurate sampling and detection of touches can occur, according to the teachings of this disclosure.

On the other hand, the second end of the serpentine strip line 112 may be un-terminated and an end of line return pulse will be received at node 120, as more fully described hereinabove. The processor 230 can then use detection of the end of line return pulse from the comparator 242 (EoP) to automatically terminate the generated pulse. This feature eliminates having to know the length of the serpentine strip line 112, or predetermine the generated pulse time. It is also advantageous to use the EoP detection signal in place of the touch return pulse signal detection to determine the actual length of the serpentine strip line 112 by allowing the output of the comparator 242 to terminate charging of the timing capacitor 270, then measuring the voltage on the timing capacitor 270 to determine the length of the serpentine strip line 112.

The functions of the comparators 238 and 594 may further be combined into one comparator by using a programmable DAC as a reference for the single comparator that may be set to VDD/2 before generation of the pulse into node 120, then set to the measured voltage at node 120 minus $\Delta V$, e.g., $V_{DD}/2-\Delta V$.

A charge time measurement unit (CTMU), more fully described in commonly owned U.S. Pat. No. 7,460,441; entitled "Measuring a Long Time Period" by James E. Bartling; U.S. Patent Application Publication No. 2010/0001889, entitled "Current-Time Digital-to-Analog Converter" by James E. Bartling; U.S. Patent Application Publication No. 2008/0204046, entitled "Capacitance Measurement Apparatus and Method" by James E. Baffling; and Microchip Application Note AN1250, entitled "Microchip CTMU for Capacitive Touch Applications" by Bruce Bohn (available at www.microchip.com); all of which are hereby incorporated by reference herein for all purposes, may be effective used in determining return pulse times, for both touch return pulse and end of transmission line return pulse, as follows. When a positive edge is created from detection of the generated pulse the CTMU starts charging the timing capacitor, then when a negative edge is created from detection of the touch return pulse the CTMU stops charging the timing capacitor. In addition, during a test/setup mode a positive edge from the comparator 242 may be used to stop charging the timing capacitor instead using the negative edge from detection of the touch return pulse.

The first and second sample switches 380 and 382 may operate alternately, wherein when the time measurement at node 120 is being determined, the previously determined time measurement taken at node 124 is being processed by the ADC 232 and the digital processor 230, and visa-versa. Therefore an advantage is that a time measurement and a touched X-Y location can be determined simultaneously. Another advantage is that two contemporaneous touches (e.g., gesturing) can be determined. Still another advantage is that the touched X-Y location can be verified by at least two different time measurements and respective position calculations, i.e., measuring the time of the reflected pulse from the impedance bump to the end connected at node 120 and converting to the associated X-Y position, then doing the same from the other end connected to node 124. The at least two calculated X-Y positions should be substantially the same. Any discrepancy therebetween can be averaged to obtain a finer resolution of the actual X-Y position touched.

Figure 4:
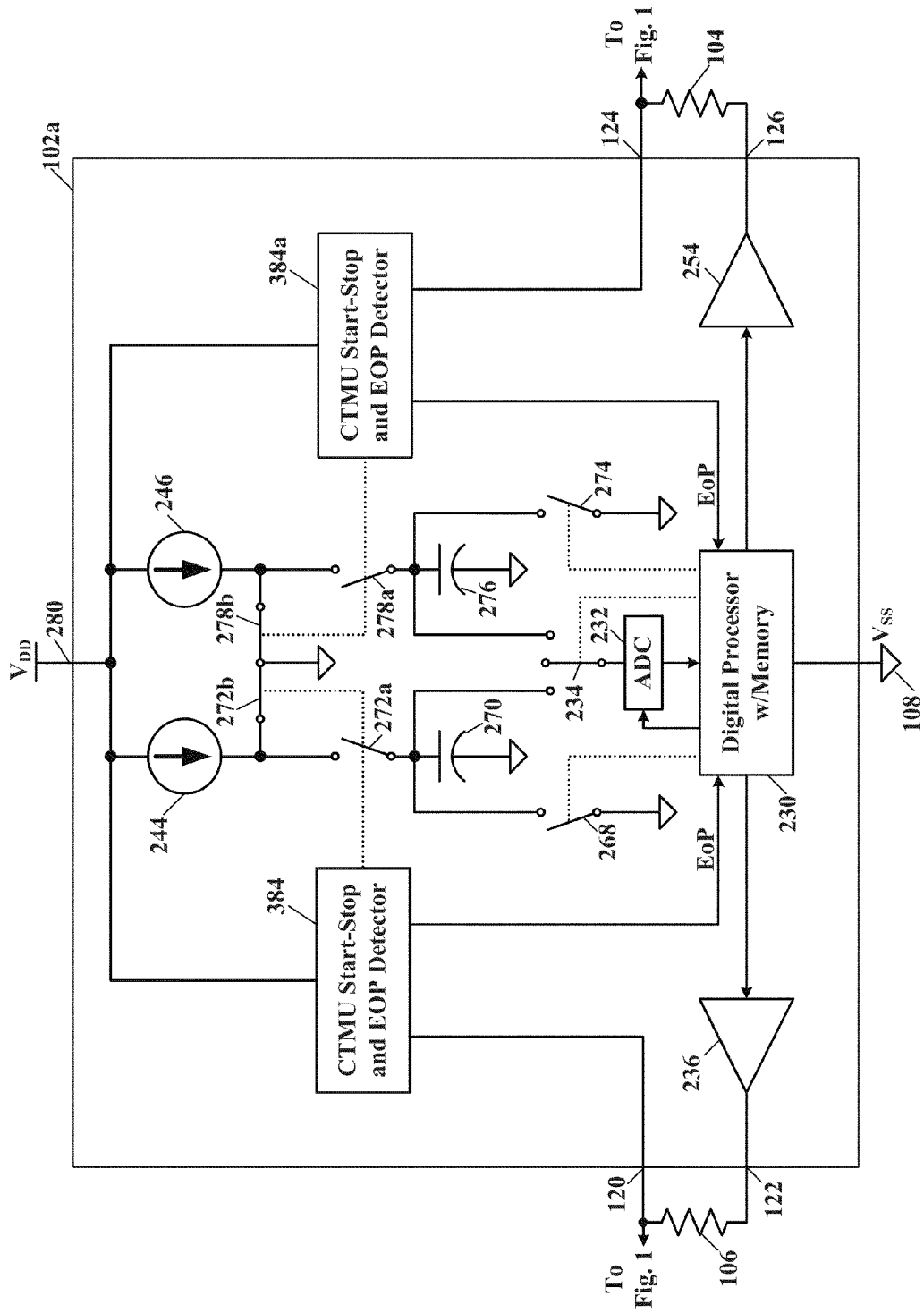
FIG. 4 illustrates a schematic block diagram of a mixed signal integrated circuit device of the touch panel or touch screen system shown in FIG. 1, according to another specific example embodiment of this disclosure.

Referring to FIG. 4, depicted is a schematic block diagram of a mixed signal integrated circuit device of the touch panel or touch screen system shown in FIG. 1, according to another specific example embodiment of this disclosure. The mixed signal integrated circuit device 102a comprises a digital processor 230 (with memory), an analog-to-digital converter 232, multiplexer switch 234, a first pulse driver 236, a second pulse driver 254, and first and second reflected pulse return time measurement circuits 384 and 384a. The digital processor 230 may be for example, but is not limited to, a microcontroller, a microprocessor, a digital signal processor (DSP), an application specific integrated circuit (ASIC), programmable logic array (PLA), and the like.

Operation of the first reflected pulse return time measurement circuits 384 and 384a shown in FIG. 4 work in substantially the same way as the reflected pulse return time measurement circuit shown in FIG. 3 and described hereinabove. The timing capacitor 270 may be part of the ADC 232, e.g., sample and hold capacitor, and the switch 234 may also be part of the ADC 232, e.g., sample switch, for economy of design for the mixed signal device 102a.

The digital processor 230 controls all operations of the circuits of the device 102 as follows. Before a source pulse is generated the timing capacitor 270 is fully discharged through the discharge switch 268. Switch symbols are shown for explanation clarity, however, normally a semiconductor device would be used for such switches. Once the timing capacitor 270 is fully discharged, the discharge switch 268 is opened. Next a pulse is generated by the digital processor 230 and sent to the first pulse driver 236. Before or contemporaneously with sending of the generated pulse to the first pulse driver 236, the output of the second pulse driver 254 is set to a high impedance (e.g., tristate logic) so that the nodes 124 and 126 are effectively at a high impedance. Now the second end of the serpentine strip line 112 at node 124 is effectively open, thereby returning the generated pulse as described hereinabove. It is contemplated and within the scope of this disclosure that the second pulse driver 254 can be set to a logic low or "0" thereby grounding node 126. By grounding node 126, the second end of the serpentine strip line 112 connected at node 124 is effectively terminated at its characteristic impedance (e.g., resistance of the second termination resistor 104) and no return pulse will be generated. Thus, a return pulse from the un-terminated second end of the serpentine strip line 112 may be used to end the generated pulse as described hereinabove, or the processor 230 may generate a pulse having a fixed duration into a terminated second end of the serpentine strip line 112. Either way will accomplish the desired result.

When the output of the first pulse driver 236 is at a logic low "0" the voltage at node 120 is at substantially zero volts. Therefore the positive input of the voltage comparator 238 is at less then $\frac{1}{4} V_{DD}$, the charging switch 272a is open, and the constant current shorting switch 272b is closed.

When the generated pulse from the output of the first pulse driver 236 is applied to node 122 the amplitude of this generated pulse at node 120 will be about $\frac{1}{2} V_{DD}$ since the resistance of the first termination resistor 106 is substantially the same as the characteristic impedance of the serpentine strip line 112, and both are in series with the output of the first pulse driver 236, i.e., a $\frac{1}{2} V_{DD}$ voltage divider. Therefore, the voltage at the positive input of the voltage comparator 238 is above $\frac{1}{4} V_{DD}$ and its output is at a logic high "1." Also the voltage at the positive input of the voltage comparator 242 is below $\frac{3}{4} V_{DD}$ and its output at a logic low "0."

The first and second reflected pulse return time measurement circuits operate alternately, wherein when the first time measurement is being determined, the previously determined second time measurement is being processed by the ADC 232 and the digital processor 230, and visa-versa. Therefore an advantage is that a time measurement and a touched X-Y location can be determined simultaneously. Another advantage is that at least two contemporaneous touches (e.g., gesturing) can be determined. Still another advantage is that the touched X-Y location can be verified by at least two different time measurements and respective position calculations, i.e., measuring the time of the reflected pulse from the impedance bump to the end connected at node 120 and converting to the associated X-Y position, then doing the same from the other end connected to node 124. The at least two calculated X-Y positions should be substantially the same. Any discrepancy therebetween can be averaged to obtain a finer resolution of the actual X-Y position touched.

Referring to FIG. 5, depicted is a more detailed schematic diagram of a specific example embodiment of the pulse edge detectors shown in FIGS. 3 and 4. The reflected pulse return time measurement circuit 384 comprises voltage comparators 238, 242 and 594, a sample and hold voltage reference 590, charging control flip-flop 282, voltage divider resistors 262, 264 and 266, constant current source 244, and a $\Delta V$ voltage subtracting diode 594. The comparator 238 has an inverting output, however, an inverter may be used on the output of a standard non-inverting output comparator. The voltage divider resistors 262, 264 and 266 provide reference voltages of $\frac{1}{4} V_{DD}$ to the negative input of the comparator 238 and $\frac{3}{4} V_{DD}$ to the negative input of the comparator 242. Therefore, when a voltage at node 120 is more positive than $\frac{1}{4} V_{DD}$ the output of the comparator 238 will go to a logic low or "0." The output of the comparator 238 at logic low or "0" causes the charging control flip-flop 282 to "set" the Q output to a logic high or "1," thereby closing the charging switch 272a, wherein the timing capacitor 270 begins charging from the constant current source 244. When the voltage at node 120 is more positive than $\frac{3}{4} V_{DD}$ the output of the comparator 242 will be at a logic high or "1." This signifies that the generated pulse has returned from the other end of the serpentine strip line 112 at node 124 that is open (at high impedance). The comparator 242 indicates this with an end of pulse (EoP) output signal to the processor 230. Once this occurs the processor 230 terminates the generated pulse.

The sample and hold voltage reference 590 will sample and store the voltage at node 120 after the output of the comparator 238 goes to a logic low or "0." This sampled and stored voltage is the voltage amplitude of the generated pulse. The diode 592 is used to drop the stored voltage from the sample and hold voltage reference 590 to a reference voltage that is $\Delta V$ less than the voltage from the sample and hold voltage reference 590, and is applied to the negative input of the comparator 594. So long as no touch return pulse is received at node 120, the output of the comparator 594 will remain at a logic high or "1." However, when a touch return pulse is received at node 120 the negative voltage amplitude thereof (FIG. 2) will cause the voltage at the positive input of the comparator 594 (from node 120) to drop below the reference voltage at the negative input of the comparator 594. When this happens, the flip-flop 282 is reset and switch 272a opens, thereby stopping charging of the timing capacitor 270. The comparator 242 operates are described more fully hereinabove.

Figure 6:
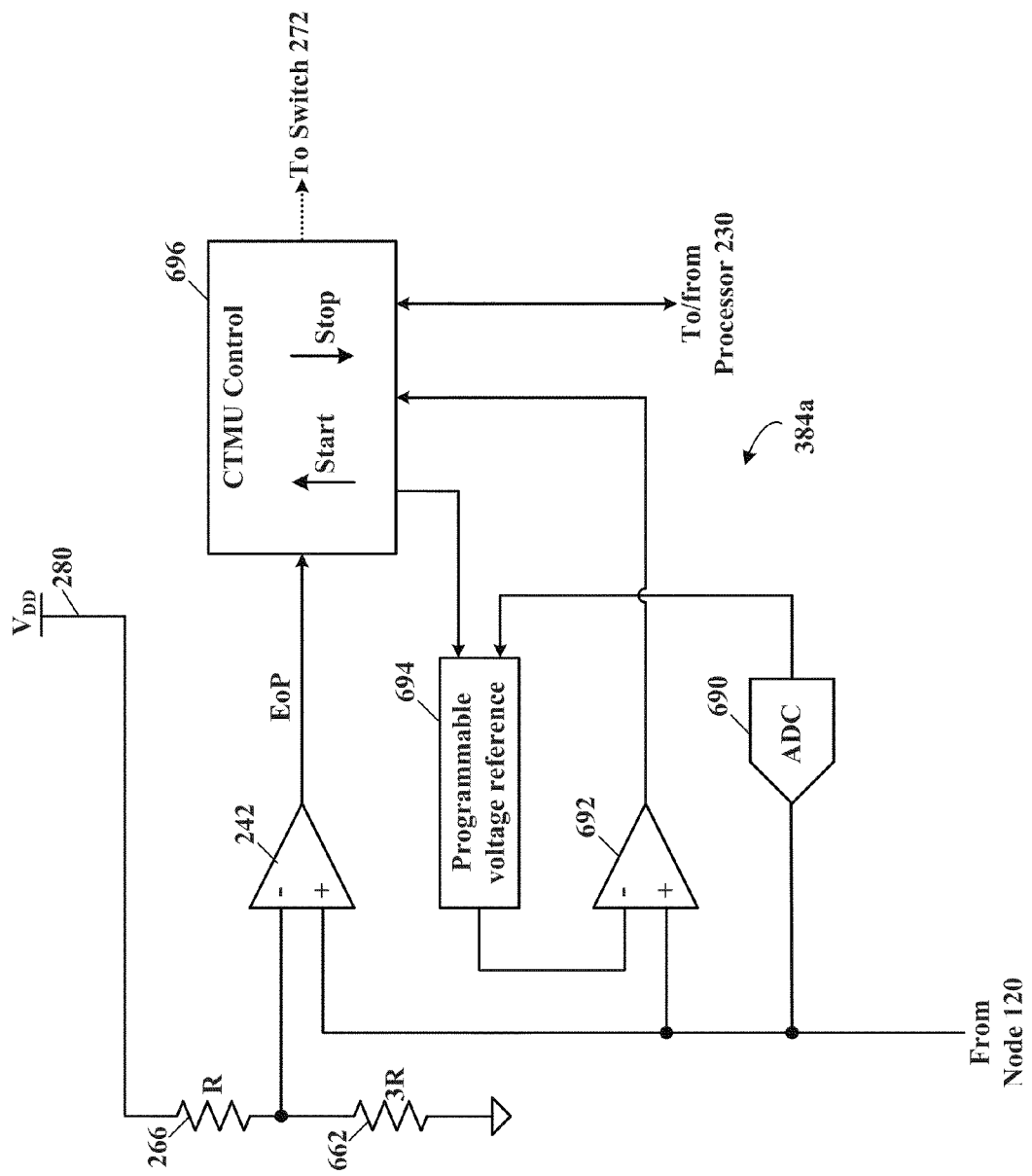
FIG. 6 illustrates a more detailed schematic diagram of another specific example embodiment of the pulse edge detectors shown in FIGS. 3 and 4.

Referring to FIG. 6, depicted is a more detailed schematic diagram of another specific example embodiment of the pulse edge detectors shown in FIGS. 3 and 4. The reflected pulse return time measurement circuit 384a comprises voltage comparators 694 and 242, a programmable voltage reference 694, an analog-to-digital converter (ADC) 690, voltage divider resistors 662 and 266, and a charge time measurement unit (CTMU) control 696. The voltage divider resistors 662 and 266, provide a reference voltage of $\frac{3}{4} V_{DD}$ to the negative input of the comparator 242. When the voltage at node 120 is more positive than $\frac{3}{4} V_{DD}$ the output of the comparator 242 will be at a logic high or "1." This signifies that the generated pulse has returned from the other end of the serpentine strip line 112 at node 124 that is open (at high impedance). The comparator 242 indicates this with an end of pulse (EoP)

output signal to the processor 230 and/or the CTMU control 696. Once this occurs the processor 230 terminates the generated pulse.

The comparator 692 in combination with the programmable voltage reference 694 provides a dual function as follows. Before a pulse is generated at node 120, the programmable voltage reference is set to approximately $V_{DD}/4$. Wherein the comparator 692 output will go from a logic low "0" to a logic high "1" (positive edge) when the pulse amplitude voltage at node 120 is greater than $V_{DD}/4$, thereby indicating the start of the generated pulse at node 120. After the start of the generated pulse, the ADC 690 converts the pulse amplitude voltage at node 120 to a digital value, and sends this digital value to the programmable voltage reference 694. The programmable voltage reference 694 then subtracts a $\Delta V$ from this digital value and thereby produces a new reference voltage of Vpulse amplitude $-\Delta V$ as the voltage reference applied to the negative input of comparator 692. When the voltage on the positive input of comparator 692 is at Vpulse amplitude, the output therefrom remains at a logic high "1."

When a touch return pulse, which has a negative amplitude, arrives back at node 120, the voltage at node 120 will drop below Vpulse amplitude$-\Delta V$ and cause the output of comparator 692 to go to a logic low "0" (negative edge). The positive edge from the comparator 692 may be used to by the CTMU control to start charging the timing capacitor 270, and the positive edge from the comparator 692 may be used to stop charging the timing capacitor 270. The voltage on the timing capacitor 270 is used in determining the touch location as described above.

The EoP signal from comparator 242 may also be used during a test and setup mode with the CTMU control 696 for determining the length of the serpentine strip line 112 as described above, in addition to notifying the processor 230 to end the generated pulse.

It is contemplated and within the scope of this disclosure that many other implementations for the mixed signal integrated circuit device 102 are possible, and one having ordinary skill in the art of mixed signal integrated circuit device design and having the benefit of this disclosure could design an equally effective device.

Figure 7:
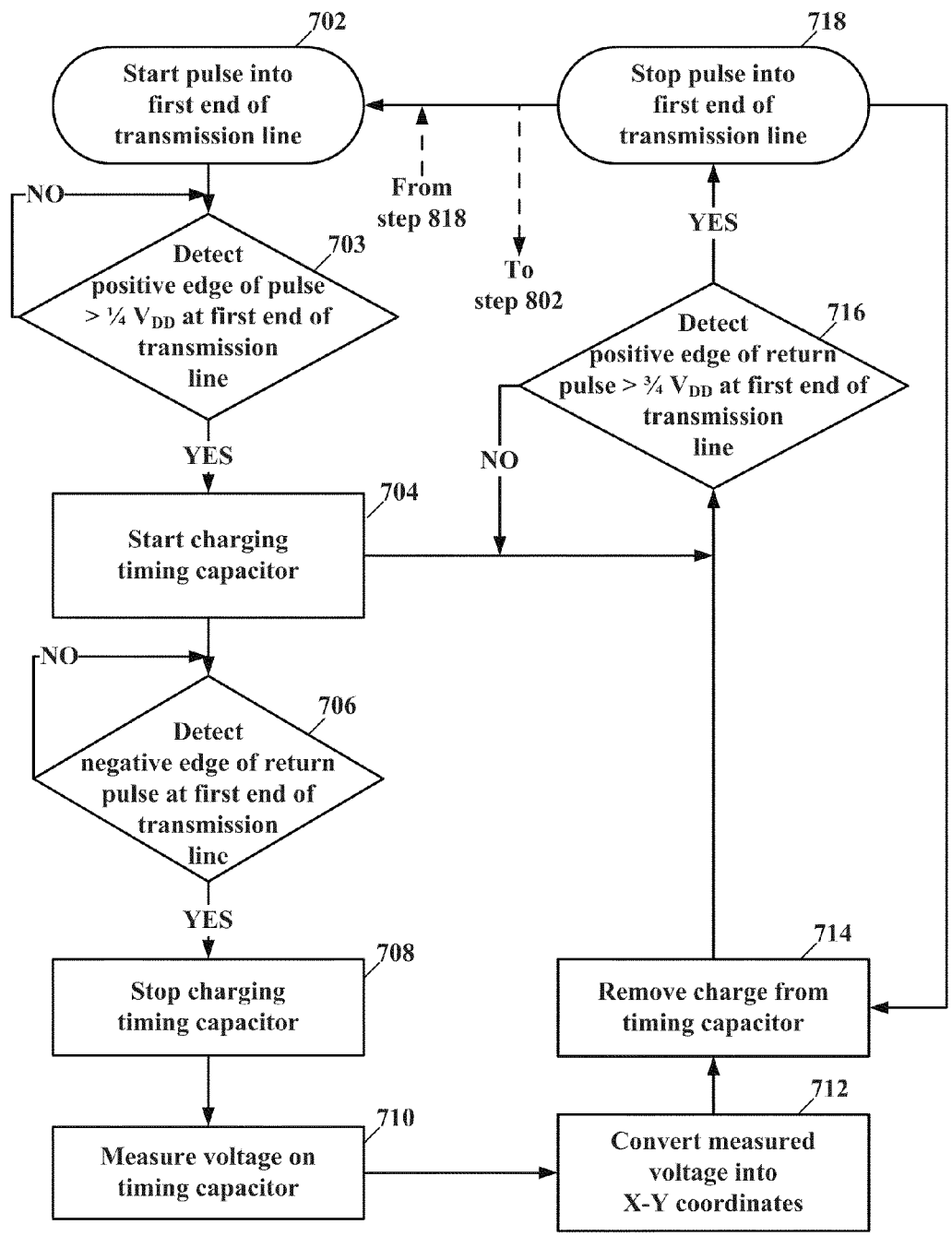
FIG. 7 illustrates a schematic process flow diagram of the operation of the touch panel or touch screen system shown in FIG. 1, according to a specific example embodiment of this disclosure.

Referring to FIG. 7, depicted is a schematic process flow diagram of the operation of the touch panel system shown in FIG. 1, according to a specific example embodiment of this disclosure. At step 702, a pulse is sent into a first end of the serpentine transmission (strip) line. In Step 703 the first end of the serpentine transmission (strip) line is monitored to detect the beginning (positive edge) of a pulse having an amplitude greater than $\frac{1}{4} V_{DD}$. Once the beginning of the pulse is detected, step 704 starts charging the timing capacitor from the constant current source.

In step 706 the first end of the serpentine transmission (strip) line is monitored to detect a return touch pulse which causes the line to go more negative, thereby producing a negative going signal edge that in step 708 stops the charging of the timing capacitor. In step 710 the voltage charge on the timing capacitor is measured, and in step 712 this measured voltage is converted into an X-Y coordinate on the touch panel. In step 714, contemporaneously with step 712, the timing capacitor charge is removed (shorted to common or ground) in preparation for the next pulse timing event. If no return touch pulse is detected in step 706, step 716 will still operate as follows.

In step 716, the first end of the serpentine transmission (strip) line is monitored to detect a return of the pulse generated in step 702. When the generated pulse returns from an open second end of the serpentine transmission (strip) line, the voltage at the first end thereof will increase to greater than $\frac{3}{4} V_{DD}$. Once the generated pulse return is detected, in step 718 the pulse need no longer be asserted. The aforementioned cycle may repeated continuously in anticipation of one or more touches to the touch panel. These pulse time measurement sequences and position determinations continue for as long as detection of touches to the touch panel are desired. Step 716 is optional in that the generated pulse may have fixed pulse time on and off durations, and thereby will start and stop automatically.

Figure 8:
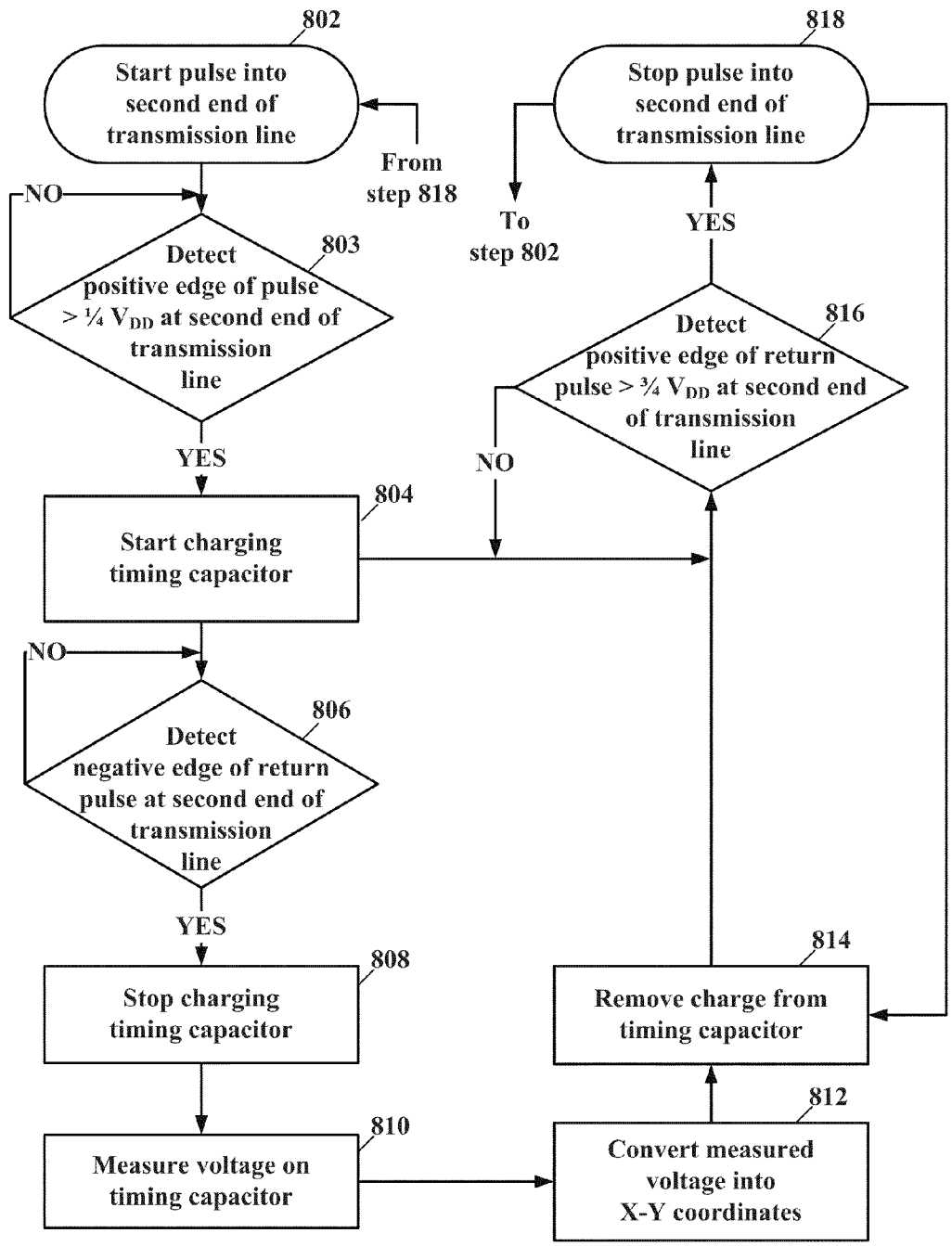
FIG. 8 illustrates a schematic process flow diagram of the operation of the touch panel system or touch screen shown in FIG. 1, according to another specific example embodiment of this disclosure.

Referring to FIG. 8, depicted is a schematic process flow diagram of the operation of the touch panel system shown in FIG. 1, according to another specific example embodiment of this disclosure. At step 802, a pulse is sent into a second end of the serpentine transmission (strip) line. In Step 803 the second end of the serpentine transmission (strip) line is monitored to detect the beginning (positive edge) of a pulse having an amplitude greater than $\frac{1}{4} V_{DD}$. Once the beginning of the pulse is detected, step 804 starts charging the timing capacitor from the constant current source.

In step 806 the second end of the serpentine transmission (strip) line is monitored to detect a return touch pulse which causes the line to go more negative, thereby producing a negative going signal edge that in step 808 stops the charging of the timing capacitor. In step 810 the voltage charge on the timing capacitor is measured, and in step 812 this measured voltage is converted into an X-Y coordinate on the touch panel. In step 814, contemporaneously with step 812, the timing capacitor charge is removed (shorted to common or ground) in preparation for the next pulse timing event. If no return touch pulse is detected in step 806, step 816 will still operate as follows.

In step 816, the second end of the serpentine transmission (strip) line is monitored to detect a return of the pulse generated in step 802. When the generated pulse returns from an open second end of the serpentine transmission (strip) line, the voltage at the second end thereof will increase to greater than $\frac{3}{4} V_{DD}$. Once the generated pulse return is detected, in step 818 the pulse need no longer be asserted. The aforementioned cycle may alternate continuously with the steps described in FIG. 7, in anticipation of one or more touches to the touch panel. These pulse time measurement sequences and position determinations continue for as long as detection of touches to the touch panel are desired. Step 816 is optional in that the generated pulse may have fixed pulse time on and off durations, and thereby will start and stop automatically.

Figure 9:
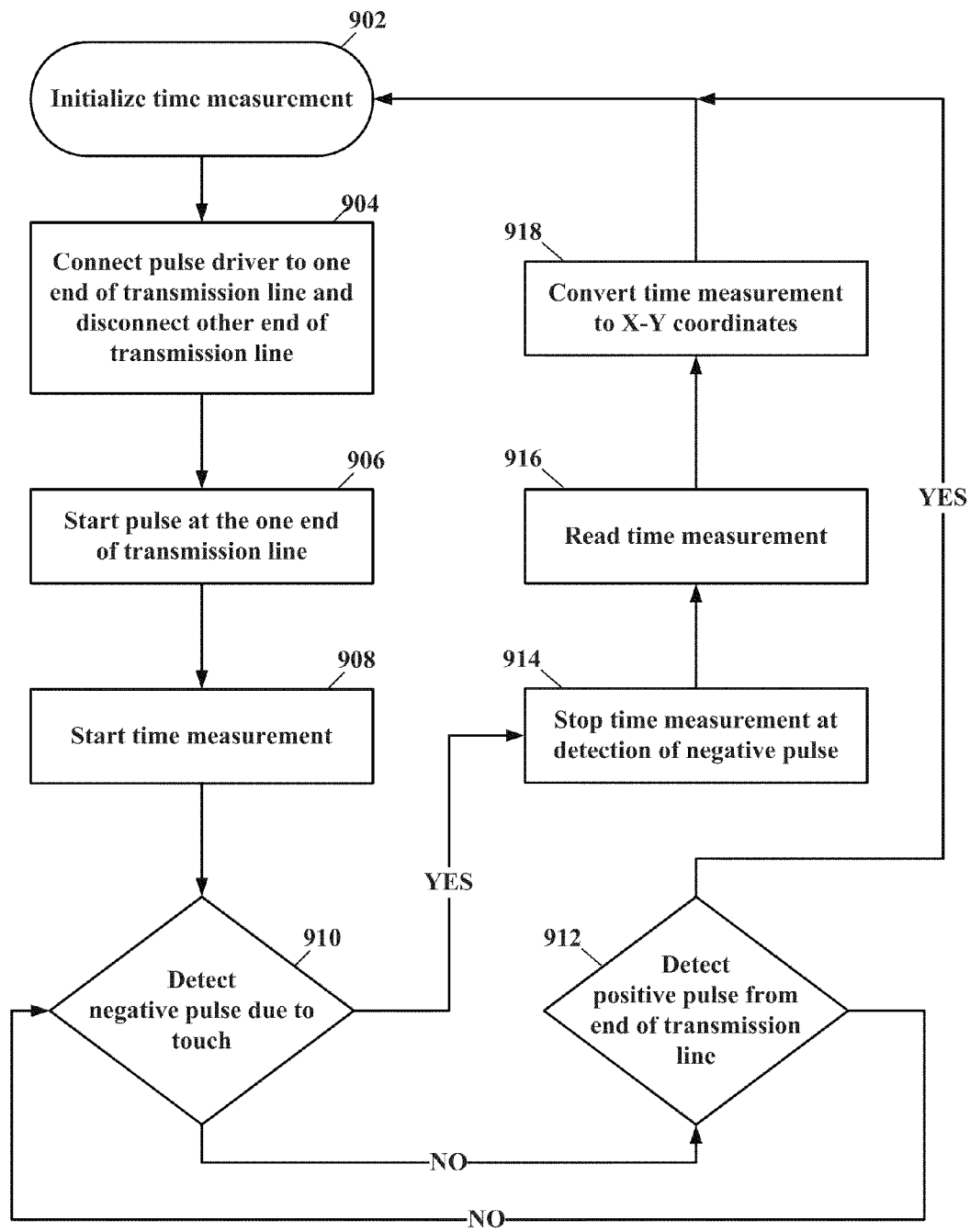
FIG. 9 illustrates a schematic process flow diagram of the operation of the touch panel system or touch screen shown in FIG. 1 for detecting and determining the location of a single touch, according to yet another specific example embodiment of this disclosure.

Referring to FIG. 9, depicted is a schematic process flow diagram of the operation of the touch panel system or touch screen shown in FIG. 1 for detecting and determining the location of a single touch, according to yet another specific example embodiment of this disclosure. In step 902, the time measurement is initialized (e.g., set to zero time). In step 904 the pulse driver is connected to one end of the serpentine transmission line and the other end of the serpentine transmission line is disconnected, e.g., at high impedance. In step 906, a pulse is generated at the pulse driver connected end of the serpentine transmission line, and in step 908 the time measurement is started. Step 910 detects when a negative pulse due to a touch returns to the one end of the serpentine transmission line. When a negative pulse is detected in step 910, the time measurement is stopped and then read in step 916. The read time measurement is converted to X-Y coordinates (representing the touch location) in step 918, then go back to step 902. When a positive pulse from the end of the transmission line is detected in step 912, then go back to step 902.

Figure 10:
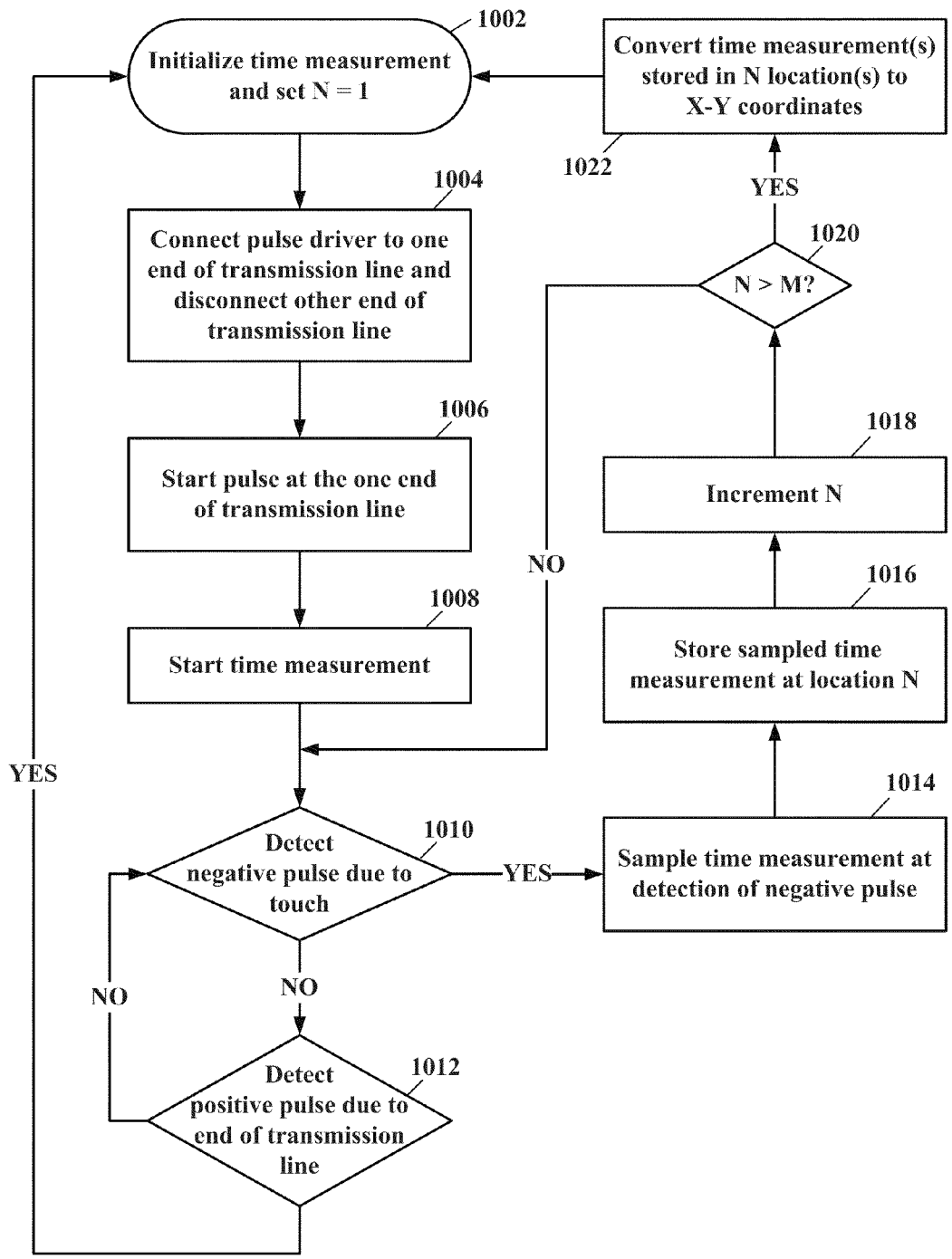
FIG. 10 illustrates a schematic process flow diagram of the operation of the touch panel system or touch screen shown in FIG. 1 for detecting and determining the locations of a plurality of touches, according to still another specific example embodiment of this disclosure.

Referring to FIG. 10, depicted is a schematic process flow diagram of the operation of the touch panel system or touch screen shown in FIG. 1 for detecting and determining the locations of a plurality of touches, according to still another specific example embodiment of this disclosure. In step 1002, the time measurement is initialized (e.g., set to zero time) and an N-count is set to one (1). In step 1004 the pulse driver is connected to one end of the serpentine transmission line and the other end of the serpentine transmission line is disconnected, e.g., at high impedance. In step 1006, a pulse is generated at the pulse driver connected end of the serpentine transmission line, and in step 1008 the time measurement is started. Step 1010 detects when a negative pulse due to a touch returns to the one end of the serpentine transmission line. When a negative pulse is detected in step 1010, the time measurement is sampled in step 1014, and in step 1016 the sampled time measurement(s) is(are) stored at location(s) N. Step 1018 increments the N-count by one, and then step 1020 determines whether the N-count is greater than M, where M is the number of sampled time measurement storage locations. If N is greater than M, then in step 1022 the stored time measurements are converted to X-Y coordinates representing touch locations. If N is not greater than M, then return to step 1010. When a positive pulse from the end of the transmission line is detected in step 1012, then go back to step 1002.

Figure 11:
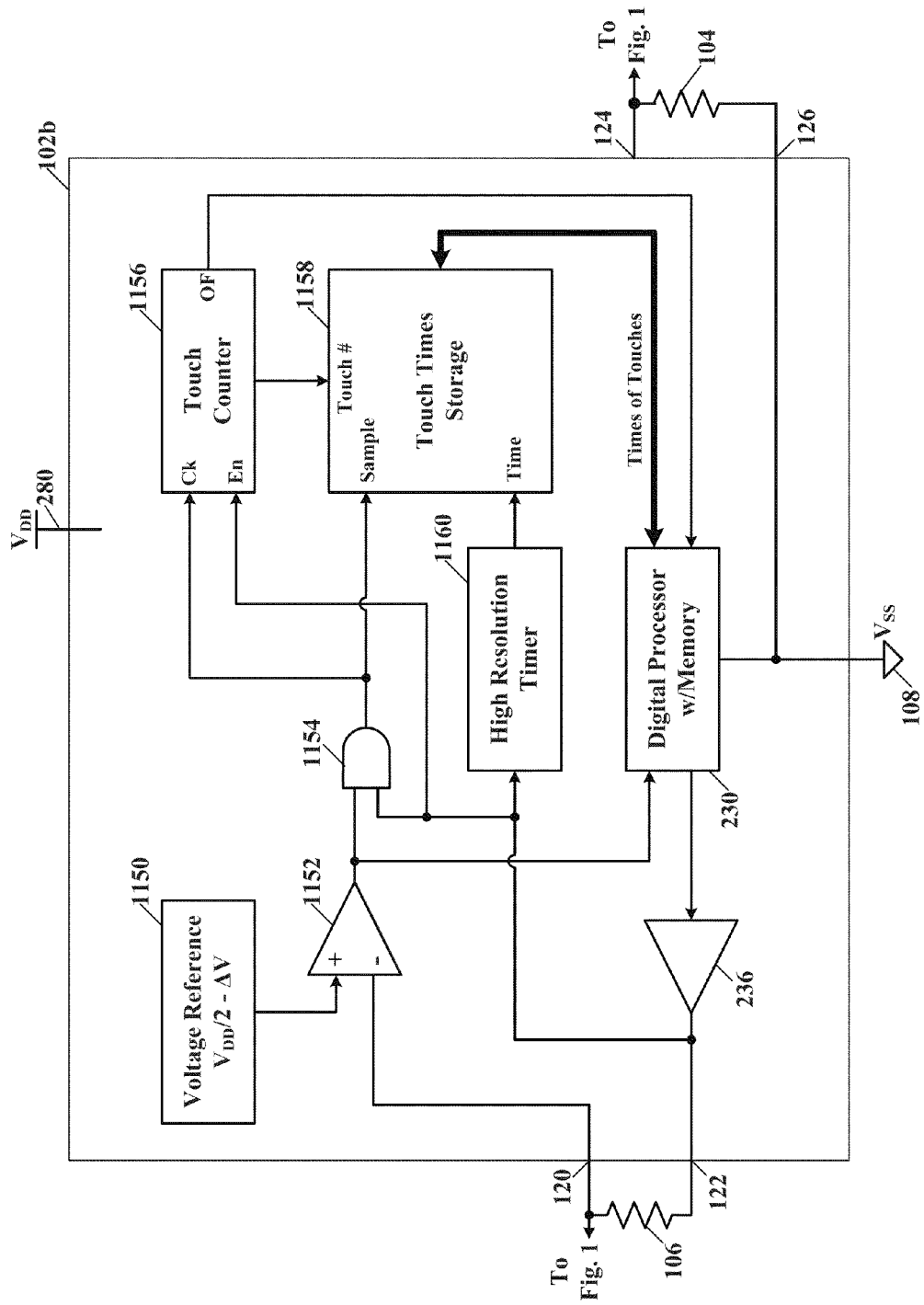
FIG. 11 illustrates a schematic block diagram of a mixed signal integrated circuit device of the touch panel or touch screen system shown in FIG. 1, according to yet another specific example embodiment of this disclosure.

Referring to FIG. 11, depicted is a schematic block diagram of a mixed signal integrated circuit device of the touch panel or touch screen system shown in FIG. 1, according to yet another specific example embodiment of this disclosure. The mixed signal integrated circuit device 102b comprises a digital processor 230 (with memory), a high resolution timer 1160, a touch counter 1156, touch times storage 1158, a pulse driver 236, a voltage comparator 1152, a voltage reference 1150 and an AND gate 1154. The digital processor 230 may be for example, but is not limited to, a microcontroller, a microprocessor, a digital signal processor (DSP), an application specific integrated circuit (ASIC), programmable logic array (PLA), and the like.

The digital processor 230 is coupled to a pulse driver 236 that drives node 122 connected to a first termination resistor 106. The first termination resistor 106 that may be substantially the same resistance value as the characteristic impedance of the serpentine strip line 112. When a generated pulse from the output of the first pulse driver 236 is applied to node 122 the amplitude of the generated pulse at node 120 will be at about $V_{DD}/2$ since the resistance of the first termination resistor 106 is substantially the same as the characteristic impedance of the serpentine strip line 112, and both are in series with the output of the first pulse driver 236, i.e., a $V_{DD}/2$ voltage divider.

A voltage from the voltage reference 1150 is coupled to the positive input of the voltage comparator 1152 and is approximately $V_{DD}/2-\Delta V$. The negative input of the voltage comparator 1152 is coupled to node 120. When the voltage at node 120 is less than $V_{DD}/2-\Delta V$, e.g., 0 volts (no generated pulse), its output is at a logic low "0." When the voltage at node 120 is greater than $V_{DD}/2-\Delta V$, e.g., $V_{DD}/2$ volts (amplitude of generated pulse), its output is at a logic high "1."

The generated pulse from the digital processor 230 may be at a fixed time duration or may be terminated by the reflected pulse coming back from the un-terminated (open) end at node 124, as described more fully hereinabove. For ease in explanation of this embodiment, a generated pulse of fixed duration will be repeated by the digital processor at selectable time intervals, for example but not limited to, every 100 milliseconds when no touch is detected and when a touch is detected every 1 millisecond for a certain selectable time period. The fixed time duration of the generated pulse need only be long enough in time for the generated pulse to travel from node 120 to node 124, and then back to node 120 of the serpentine strip line 112. Off times of the generated pulse may be variable, e.g., when no touch has been detected fewer pulses are generated per time interval, and when at least one touch is detected, more frequent pulses are generated per time interval.

Since the embodiment shown in FIG. 11 generates fixed time duration pulses, the node 124 connected to the second end of the serpentine strip line 112 can be open, shorted, or terminated at the characteristic impedance of the serpentine strip line 112. This embodiment works equally well with a return generated pulse detector as more fully described for the embodiment shown in FIG. 3.

When the output of the pulse driver 236 is at a logic low "0" the voltage at node 120 is at substantially zero volts, the negative input of the voltage comparator 1152 is less then $V_{DD}/2-\Delta V$, and the output of the comparator 1152 is at a logic high "1." However, the AND gate 1154 has one of its inputs at logic low "0" so its output remains at logic low "0." Also the touch counter 1156 is set to zero (0) count when its enable input is at logic low "0." The high resolution timer 1160 remains at time zero (0) so long as its input connected to the first pulse driver 236 remains at logic low "0."

Once a pulse is generated at node 120, the negative input of the comparator 1152 goes to approximately $V_{DD}/2$ and the output of the comparator 1152 goes to a logic low "0." The high resolution timer 1160 is enabled when its input is at a logic one "1" and starts timing as more fully described hereinbelow. The AND gate 1154 has one input at a logic one "1" and the other input at a logic low "0" (output of the comparator 1152). When a negative going return pulse caused by a touch is received back at node 120, the voltage at the negative input of the comparator 1154 will be less than $V_{DD}/2-\Delta V$, and the output of the comparator 1154 will go to a logic high "1." Now both inputs of the AND gate 1154 will be at logic one "1" and the output of the AND gate 1154 will thereby go to a logic one "1."

When the output of the AND gate 1154 goes to logic one "1" a sample of the time value associated with the touch return pulse will be taken and stored in the touch times storage 1158. Also the touch counter 1156 will be incremented. The count from touch counter 1156 is used to select a different time value storage means for each touch return pulse received during the time duration of the generated pulse, e.g., a first touch return pulse time will be stored in a first time value storage means, a second touch return pulse time will be stored in a second time value storage means, etc. If the touch counter 1156 overflows (caused by receiving too many detected touch return pulses), then the digital processor can terminate the generated pulse early and start a new generated pulse, thereby resetting the touch counter 1156. The digital processor 230 may read the captured touch return pulse time(s) during the generated pulse time interval or at any time thereafter. The touch times storage 1158 may be reset or overwritten at the end of each generated pulse.

It is contemplated and within the scope of this disclosure that duplicate high resolution timers 1160, touch time storage 1158, and touch counters 1156 may be utilized when alternately generated pulses at nodes 120 and 124 are implemented as more fully described for the embodiments shown in FIGS. 3 and 4 hereinabove, and with all of the aforementioned benefits thereof.

Figure 12:
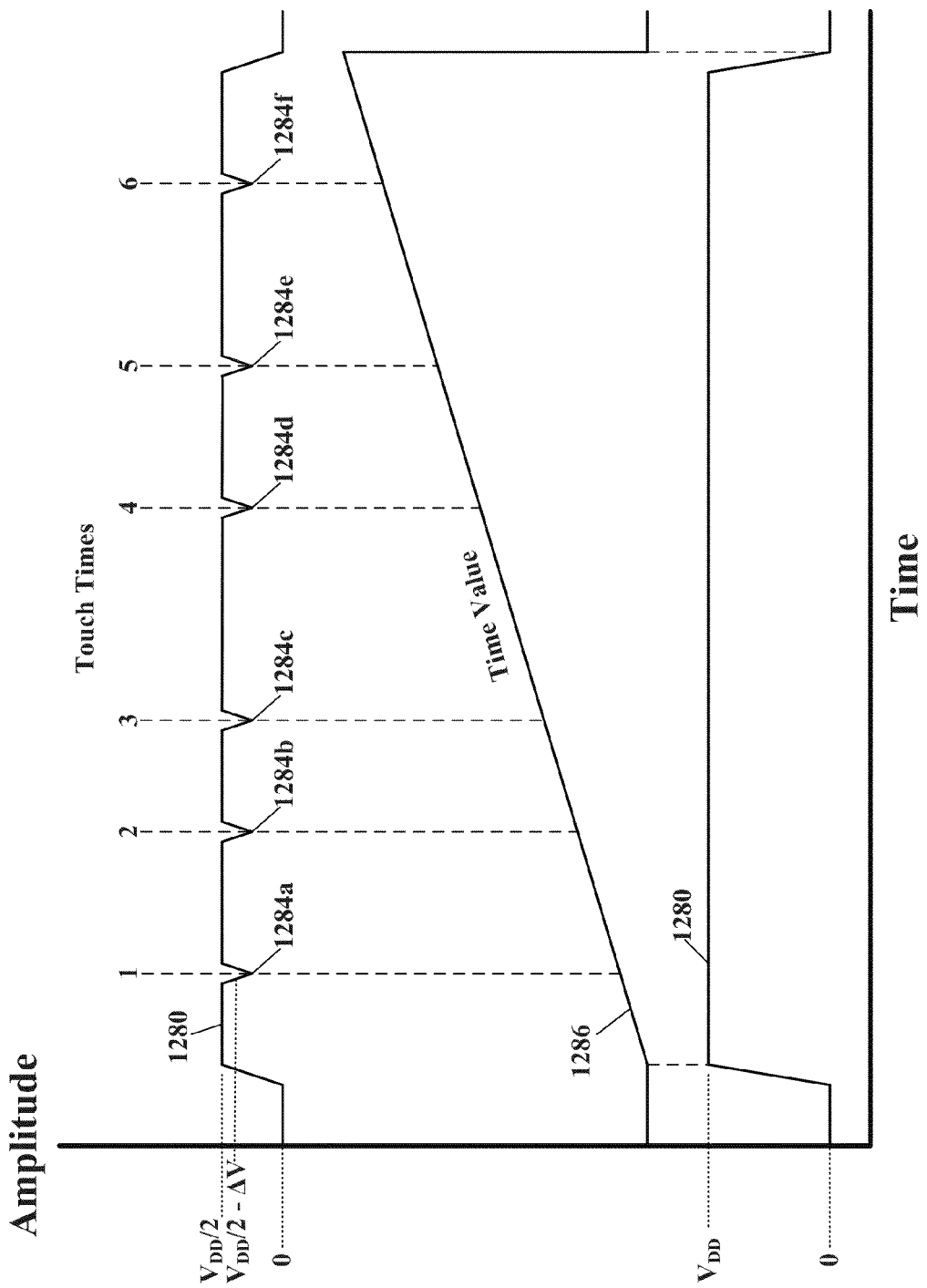
FIG. 12 illustrates a schematic time-amplitude graph of operation of the mixed signal integrated circuit device of the touch panel or touch screen system shown in Figure A.

Referring to FIG. 12, depicted is a schematic time-amplitude graph of operation of the mixed signal integrated circuit device of the touch panel or touch screen system shown in FIG. 11. When the generated pulse 1280 goes to a logic high "1" the voltage 1282 at node 120 will go to approximately $V_{DD}/2$. However, when a touch return pulse 1284 occurs the voltage 1282 will drop below $V_{DD}/2-\Delta V$ and trigger a touch time "capture"(represented by the vertical dashed lines numbered 1-6) of the time value(s) 1286 associated with that touch return pulse(s) 1284, as describe more fully hereinabove.

Figure 13:
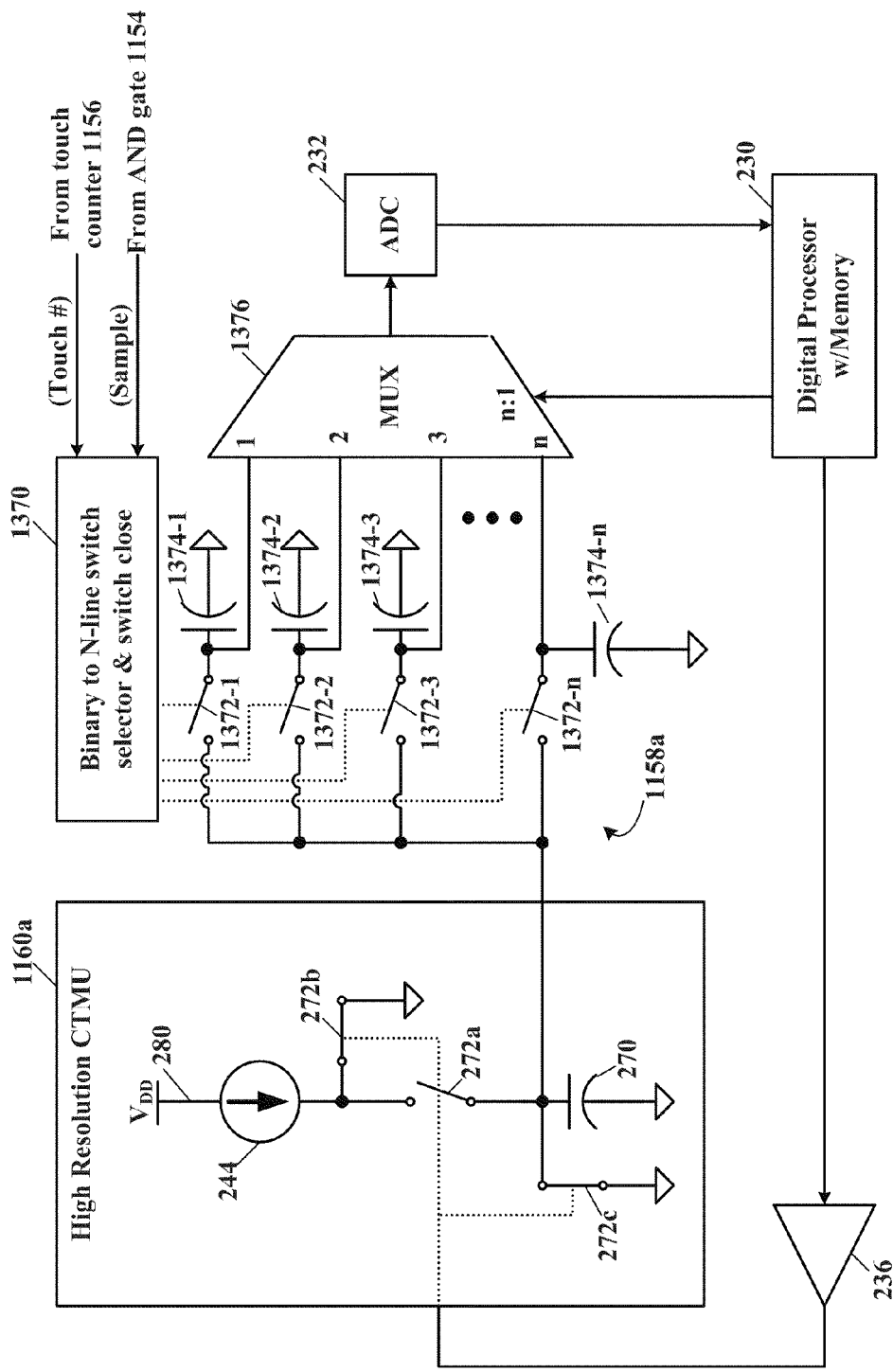
FIG. 13 illustrates a more detailed schematic diagram of a precision time reference, multiple touch time capture and touch time storage circuits, according to a specific example embodiment of this disclosure.

Referring to FIG. 13, depicted is a more detailed schematic diagram of a precision time reference, multiple touch time capture and touch time storage circuits, according to a specific example embodiment of this disclosure. A high resolution timer 1160a comprises a constant current source 244, a timing capacitor 270, and start/stop time switches 272. When the output of the pulse driver 236 is at a logic low "0," switch 272a is open and switches 272b and 272c are closed. The voltage charge on the timing capacitor 270 will be substantially zero (0) volts. When the output of the pulse driver 236 is goes to a logic high "1," switch 272a will close and switches 272b and 272c will open. Now the constant current source 244 will begin charging the timing capacitor 270, as described more fully hereinabove.

When a touch return pulse is detected, the output of AND gate 1154 will go to a logic high "1" which causes one of the switches 1372 to close so that the voltage charge on the timing capacitor 270 associated with that touch return pulse is sampled and stored in a respective one of the sample and hold capacitors 1374. The touch counter 1156 determines which one of the switches 1372 closes for the presently detected touch return pulse. The times of a plurality of touches may be captured and determined when the generated pulse is at a logic high "1" and within the maximum voltage charge of the timing capacitor 270. Preferably the generated pulse time and the maximum charge occur contemporaneously with each other. The generated pulse repeats as described herein above, and before the start of each generated pulse the voltage charge on the timing capacitor 270 is brought back to zero volts by closure of the switch 272c.

The digital processor 230 controls the multiplexer 1376 which is used to connect each one of the sample and hold capacitors 1374 to the ADC 232 for converting the voltages representing the times of the touch return pulses into digital time values for further processing into touch distances by the digital processor 230.

Figure 14:
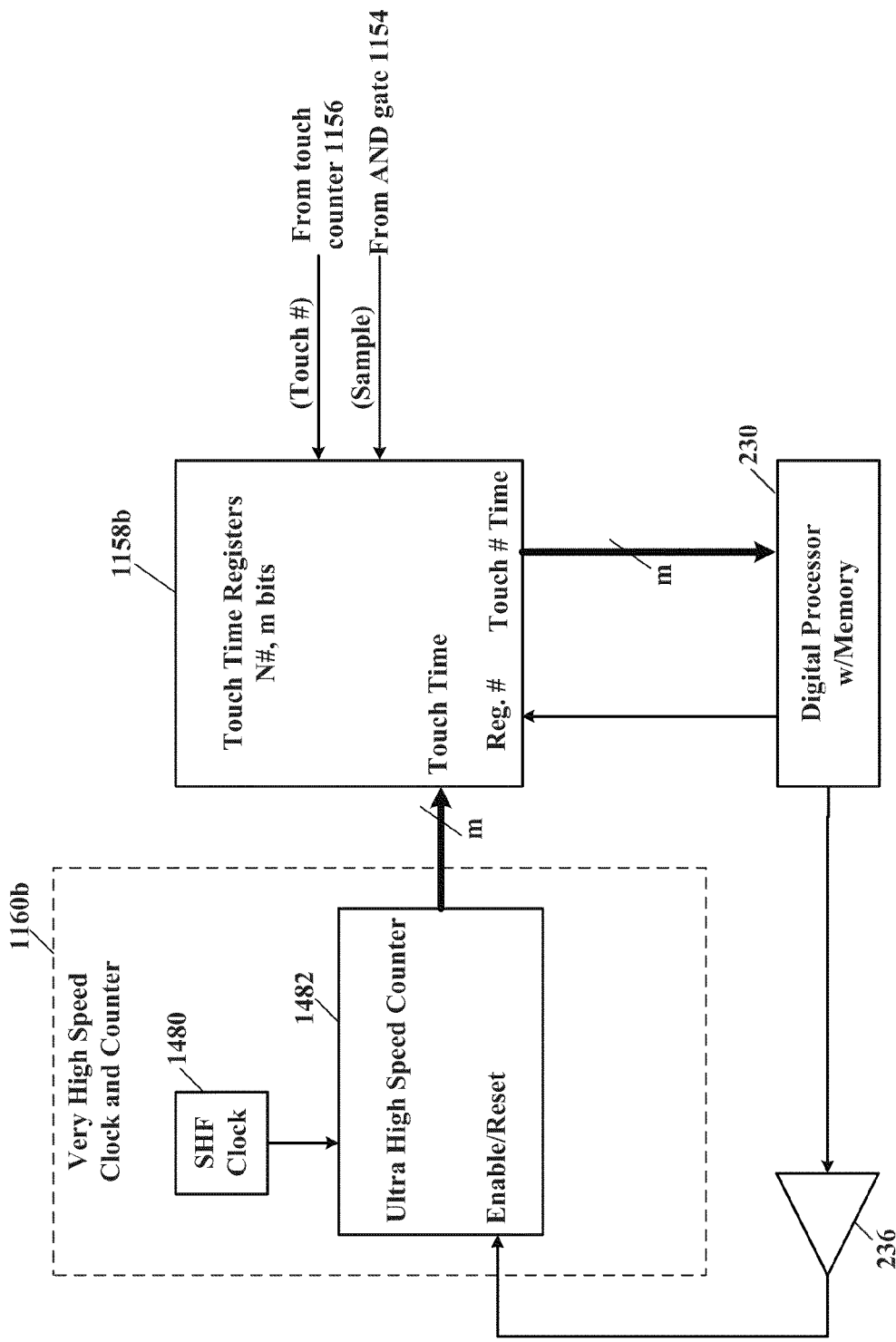
FIG. 14 illustrates a more detailed schematic diagram of a precision time reference, multiple touch time capture and touch time storage circuits, according to another specific example embodiment of this disclosure.

Referring to FIG. 14, depicted is a more detailed schematic diagram of a precision time reference, multiple touch time capture and touch time storage circuits, according to another specific example embodiment of this disclosure. A very high speed clock and counter 1160a comprises a super high frequency clock 1480 and an ultra-high speed counter 1482. When the output of the pulse driver 236 is at a logic low "0," the ultra-high speed counter 1482 is reset and held at zero (0) counts. When the output of the pulse driver 236 goes to a logic high "1," the ultra-high speed counter 1482 is enabled and begins counting.

When a touch return pulse is detected, the output of AND gate 1154 will go to a logic high "1" which causes one of a plurality of touch time registers in the touch times storage 1158 to capture the time count from the ultra-high speed counter 1482 representative of an associated touch return pulse time. The touch counter 1156 determines which one of the plurality of touch time registers is selected to capture the time value of the detected touch return pulse. Times of a plurality of touches may be captured and determined when the generated pulse is at a logic high "1" and within the maximum number of the plurality of touch time registers. The generated pulse repeats as described herein above. The plurality of touch time registers may be overwritten during the next generated pulse or reset after the end of the presently generated pulse. The digital processor 230 reads the digital time values stored in the plurality of touch time registers representing the times of the touch return pulses and processes them into touch distances as described more fully hereinabove.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for sensing a touch to a substrate and determining a location thereof, said method comprising the steps of:
    providing a serpentine transmission line fabricated on a substrate comprising a plurality of touch locations having a first and second end;
    unterminating a second end of the serpentine transmission line;
    sending a first pulse to the first end of the serpentine transmission line;
    charging a timing capacitor with a constant current source until a first touch return pulse is received at the first end of the serpentine transmission line;
    measuring a first voltage on the timing capacitor;
    converting the measured first voltage to a first location on the substrate;
    unterminating the first end of the serpentine transmission line;
    sending a second pulse to the second end of the serpentine transmission line;
    charging the timing capacitor with the constant current source until a second touch return pulse is received at the second end of the serpentine transmission line;
    measuring a second voltage on the timing capacitor; and
    converting the measured second voltage to a second location on the substrate.

2. The method according to claim 1, wherein the step of unterminating the first or second end of the transmission line is performed by controlling a first driver having an output coupled with the first end of the transmission line through a first termination resistor to be set in high impedance or by controlling a second driver having an output coupled with the second end of the transmission line through a second termination resistor to be set in high impedance.

3. The method according to claim 2, further comprising the steps of alternately sending the first pulse to the first end of the serpentine transmission line for determining the first location, then sending the second pulse to the second end of the serpentine transmission line for determining the second location, and continuously repeating these steps.

4. The method according to claim 1, wherein the step of charging the timing capacitor comprises the steps of:
    start charging the timing capacitor with the constant current source upon detecting a first pulse voltage level at the first end of the serpentine transmission line with a first voltage comparator; and
    stop charging the timing capacitor upon detecting a first return touch pulse voltage level at the first end of the serpentine transmission line with a second voltage comparator, wherein the first return touch pulse voltage level is less than the first pulse voltage level.

5. The method according to claim 1, wherein the step of measuring the first voltage on the timing capacitor is done with an analog-to-digital converter (ADC).

6. The method according to claim 1, wherein the step of converting the measured first voltage to the first location on the substrate comprises the step of finding a first voltage value corresponding to the measured first voltage in a look-up table having a plurality of first voltage values and their corresponding locations on the substrate.

7. The method according to claim 1, wherein the step of converting the measured first voltage to the first location on the substrate comprises the steps of:
calculating a first distance along the serpentine transmission line by multiplying the measured first voltage with a constant derived from the speed of light and a velocity factor of the serpentine transmission line; and
finding a first distance value corresponding to the calculated first distance in a look-up table having a plurality of first distance values and their corresponding locations on the substrate.

8. The method according to claim 2, further comprising the step of averaging the first and second locations for improving resolution of the location touched on the substrate.

9. The method according to claim 3, further comprising the step of averaging a plurality of the first and second locations for improving resolution of the location touched on the substrate.

10. The method according to claim 3, further comprising the step of determining locations of at least two contemporaneous touches to the substrate within a certain time period.

11. The method according to claim 10, further comprising the step of determining a gesturing motion from the at least two contemporaneous touches to the substrate within the certain time period.

12. The method according to claim 1, wherein the substrate is a touch panel comprising a printed circuit board having the serpentine transmission line on a front printed circuit side thereof, and a back printed circuit side covered with an electrical conductor.

13. The method according to claim 1, wherein the substrate is a touch screen comprising a light transmissive insulating material having a front side with the serpentine transmission line thereon and a back side covered with a light transmissive electrical conductor.

14. The method according to claim 1, further comprising the step of ending the first pulse when a voltage is detected at the first end of the serpentine transmission line that is greater than a first end voltage level at the beginning of the first pulse.

15. The method according to claim 1, further comprising the step of ending the second pulse when a voltage is detected at the second end of the serpentine transmission line that is greater than a second end voltage level at the beginning of the second pulse.

16. A method for sensing a touch to a substrate and determining a location thereof, said method comprising the steps of:
a) initializing a time of a time measurement device;
b) coupling a pulse driver to a first end of a serpentine transmission line fabricated on a substrate comprising a plurality of touch locations, wherein the serpentine transmission line is un-terminated at a second end thereof;
c) start sending a pulse with the pulse driver at the first end of the serpentine transmission line;
d) starting the time in the time measurement device;
e) detecting whether a negative return pulse, caused by a touch on the substrate, is received at the first end of the serpentine transmission line, wherein
if the negative return pulse is detected then going to step g), and
if not then going to step f);
f) detecting when a positive return pulse is received at the first end of the serpentine transmission line, the positive return pulse being from the un-terminated second end of the serpentine transmission line, wherein
if the positive return pulse is detected then returning to step a), and
if not then returning to step e);
g) stopping the time in the time measurement device;
h) reading the time from the time measurement device; and
i) converting the time read from the time measurement device into a location of the touch on the substrate then returning to step a).

17. An apparatus for sensing a touch to a substrate and determining a location thereof, comprising:
a pulse generator for generating pulses;
a first pulse driver having an input coupled to the pulse generator and an output coupled through a first resistor to a first end of a serpentine transmission line fabricated on a substrate, wherein the output of the first pulse driver can be controlled to be set into high impedance,
a second pulse driver having an input coupled to the pulse generator and an output coupled through a second resistor to the second end of the serpentine transmission line, wherein the output of the second pulse driver can be controlled to be set into high impedance;
wherein the first and second resistors each have resistances that are substantially equal to a characteristic impedance of the serpentine transmission line;
a constant current source;
a timing capacitor;
an analog-to-digital converter (ADC); and
a digital processor;
wherein the digital processor controls the output of the second driver to be set in high impedance and wherein the pulse generator generates a first pulse to the first pulse driver which sends the first pulse to the first end of the serpentine transmission line, and then the constant current source starts charging the timing capacitor until a first return pulse is received at the first end of the serpentine transmission line;
a first voltage charge on the timing capacitor is sampled by the ADC and converted to a first digital value; and
the digital processor receives the first digital value from the ADC and converts the first digital value to a first location on the substrate.

18. The apparatus according to claim 17, wherein the constant current source starts charging the timing capacitor when a first voltage comparator detects the first pulse from the pulse generator at the first end of the serpentine transmission line, and stops charging the timing capacitor when a second voltage comparator detects the first return pulse at the first end of the serpentine transmission line.

19. The apparatus according to claim 17, wherein the digital processor comprises a microcontroller.

20. The apparatus according to claim 17, wherein the digital processor is selected from the group consisting of a microprocessor, a digital signal processor (DSP), an application specific integrated circuit (ASIC), and programmable logic array (PLA).

21. The apparatus according to claim 17, wherein the substrate is a touch panel comprising a printed circuit board having the serpentine transmission line on a front printed circuit side thereof, and a back printed circuit side covered with an electrical conductor.

22. The apparatus according to claim 17, wherein the substrate is a touch screen comprising a light transmissive insulating material having a front side with the serpentine transmission line thereon and a back side covered with a light transmissive and electrically conductive material.

23. The apparatus according to claim 22, wherein the light transmissive and electrically conductive material is indium tin oxide (ITO).

24. The apparatus according to claim 22, further comprising a graphical display, the touch screen is between the graphical display and a field of vision.

25. The apparatus according to claim 24, wherein the graphical display is selected from the group consisting of a liquid crystal display (LCD), a light emitting diode (LED) display, a plasma display, and an organic light emitting diode (OLED) display.

26. A method for sensing a touch to a substrate and determining a location thereof, said method comprising the steps of:

sending a first pulse to a first end of a serpentine transmission line fabricated on a substrate comprising a plurality of touch locations while a second end of the transmission line is unterminated by switching an output of a driver into high impedance, wherein the output of the driver is coupled with the second end through a terminating resistor;

charging a timing capacitor with a constant current source until a first touch return pulse is received at the first end of the serpentine transmission line;

measuring a first voltage on the timing capacitor; and converting the measured first voltage to a first location on the substrate.

27. The apparatus according to claim 17, wherein the digital processor controls the output of the first driver to be set in high impedance and wherein the pulse generator generates a second pulse to the second pulse driver which sends the second pulse to the second end of the serpentine transmission line, and then the constant current source starts charging the timing capacitor until a second return pulse is received at the second end of the serpentine transmission line;

a second voltage charge on the timing capacitor is sampled by the ADC and converted to a second digital value; and the digital processor receives the second digital value from the ADC and converts the second digital value to a second location on the substrate.

\* \* \* \* \*